US012607434B2

(12) United States Patent
Chung et al.

(10) Patent No.: US 12,607,434 B2
(45) Date of Patent: Apr. 21, 2026

(54) DEVICE FOR TRACKING TARGET AND SYSTEM INCLUDING THE SAME

(71) Applicant: NEARTHLAB INC., Seoul (KR)

(72) Inventors: Youngsuk Chung, Seoul (KR); Hoyoung Na, Seoul (KR); Daeyun Shin, Seoul (KR); Dongyeon Lee, Seoul (KR); Donggeun Lee, Seoul (KR)

(73) Assignee: NEARTHLAB INC., Seoul (KR)

( * ) Notice: Subject to any disclaimer, the term of this patent is extended or adjusted under 35 U.S.C. 154(b) by 0 days.

(21) Appl. No.: 19/126,732

(22) PCT Filed: Oct. 21, 2024

(86) PCT No.: PCT/KR2024/015947
§ 371 (c)(1),
(2) Date: May 2, 2025

(65) Prior Publication Data
US 2026/0104236 A1    Apr. 16, 2026

(30) Foreign Application Priority Data
Oct. 16, 2024    (KR) ........................ 10-2024-0140907

(51) Int. Cl.
*G06T 7/20*    (2017.01)
*F41H 11/02*    (2006.01)

(52) U.S. Cl.
CPC ................ *F41H 11/02* (2013.01); *G06T 7/20* (2013.01); *G06T 2207/10032* (2013.01); *G06T 2207/30241* (2013.01)

(58) Field of Classification Search
CPC . F41H 11/02; G06T 7/20; G06T 2207/10032; G06T 2207/30241
See application file for complete search history.

(56) References Cited

U.S. PATENT DOCUMENTS 10,755,420 B2 *  8/2020  Heo ..................... G06V 10/255
2020/0288065 A1 *  9/2020  Zhang .................... G06V 20/13

FOREIGN PATENT DOCUMENTS

| JP | 2019-060589 A | 4/2019 |
| KR | 10-2002-0042328 A | 6/2002 |
| KR | 10-1748305 B1 | 6/2017 |

(Continued)

OTHER PUBLICATIONS

KIPO Office Action for Application No. 10-2024-0147297 dated Mar. 4, 2025.

(Continued)

*Primary Examiner* — Jamara A Franklin
(74) *Attorney, Agent, or Firm* — Sughrue Mion, PLLC

(57)    ABSTRACT
A target tracking device for tracking a target TG, comprising: a memory storing at least one instruction; and at least one processor executing the at least one instruction, wherein the at least one processor: identifies the target based on at least one of radar data acquired through a radar and vision data acquired through a camera, and performs a guidance process to approach the identified target, performs a first guidance process at a first tracking time point to track the target in a certain manner, and performs a second guidance process at a second tracking time point, which is chronologically subsequent to the first tracking time point, to track the target in a manner different from the certain manner.

10 Claims, 23 Drawing Sheets

(56)       References Cited

FOREIGN PATENT DOCUMENTS

| KR | 10-2296962 B1 | 9/2021 |
| KR | 10-2334679 B1 | 12/2021 |
| KR | 10-2392822 B1 | 5/2022 |
| KR | 10-2024-0064964 A | 5/2024 |

OTHER PUBLICATIONS

KIPO Office Action for Application No. 10-2024-0140907 dated Feb. 10, 2025.
KIPO Office Action for Application No. 10-2024-0140907 dated Jan. 1, 2025.

* cited by examiner

DEVICE FOR TRACKING TARGET AND SYSTEM INCLUDING THE SAME

CROSS REFERENCE TO RELATED APPLICATIONS

This application is a National Stage of International Application No. PCT/KR2024/015947, filed on Oct. 21, 2024, which claims priority from Korean Patent Application No. 10-2024-0140907, filed on Oct. 16, 2024, the entire disclosures of which are incorporated herein by reference.

TECHNICAL FIELD

The present disclosure relates to a device and method for tracking a target and a system including the same.

More specifically, the present disclosure relates to a target tracking device capable of tracking a target quickly and precisely and a system including the same.

BACKGROUND ART

The content described in this section simply provides background information for the present embodiment and does not constitute the prior art.

In general, as an anti-drone method against threat drones or illegal drones, a soft kill method, which includes techniques such as jamming or spoofing of Global Navigation Satellite System (GNSS) signals, has been widely used.

However, such soft kill methods have limitations in that they cannot provide a complete response to threat drones or illegal drones. Specifically, methods such as jamming or spoofing cannot guarantee the completeness of the response, and various communication technologies and aircraft operation technologies have been developed to mitigate the effects of jamming and spoofing.

Due to these issues, there has recently been a need to counter threat drones and illegal drones through a hard kill method that directly tracks and strikes a target. However, in the case of such a hard kill method, it has been difficult to commercialize due to the following reasons: as the flight technology of target drones advances, tracking a target through manual flight is not easy, and achieving fast and precise strikes inevitably involves high costs and operational complexity.

Accordingly, there is a strong demand for a hard kill drone that offers sufficient economic feasibility and can be flexibly utilized depending on the operational environment.

SUMMARY OF INVENTION

Technical Problem

An object of the present disclosure is to provide a target tracking device capable of performing a hard kill on a target, including threat drones and illegal drones, and a system including the same. In other words, an object of the present disclosure is to provide a target tracking device capable of determining the position of a target, including threat drones and illegal drones, and directly striking the target according to the determined position, and a system including the same.

Additionally, an object of the present disclosure is to provide a target tracking device and a system including the same, which achieve sufficient economic feasibility by integrating hardware performance for high-speed movement, control performance for controlling the hardware, and Artificial Intelligence (AI) performance for automation in the target tracking process.

Furthermore, an object of the present disclosure is to provide a target tracking device and a system including the same, which can be universally applied to sites where various threats occur and can be flexibly utilized according to the operational environment.

Solution to Problem

A target tracking device for tracking a target according to some embodiments of the present disclosure includes a memory storing at least one instruction and at least one processor executing the at least one instruction, wherein the at least one processor identifies the target based on vision data acquired through a camera included in the target tracking device and performs a guidance process to approach the identified target, wherein the vision data includes at least one of Electro-Optical (EO) images and Infrared (IR) images, and the at least one processor may identify the target from the vision data based on a preprocessed image, which is a result of preprocessing the EO image, at least one of the IR images, and a pre-trained detection model.

Additionally, the processor may identify the target from the vision data using the detection model and set a flight trajectory to approach the identified target based on a predefined navigation rule.

Furthermore, the predefined navigation rule may include a proportional navigation guidance rule.

Additionally, the processor may generate the preprocessed image by inverting the colors of the EO image.

Moreover, the detection model may be pre-trained to recognize the target from the input data when at least one of the preprocessed image and the IR image is input as input data, and output a bounding box displayed along the outline of the recognized target and the recognition accuracy probability of the recognized target as output data.

Additionally, the processor may correct the position of at least one of the target and the target tracking device based on sensing data acquired by a sensor included in the target tracking device during the guidance process.

Furthermore, the sensing data may include at least one of Inertial Measurement Unit (IMU) data, Global Positioning System (GPS) data, and gyroscope data.

Additionally, the target tracking device may include a plurality of cameras oriented in different directions, and the processor may determine which camera among the plurality cameras to operate based on the position of the identified target.

Furthermore, the target tracking device may include a plurality of cameras oriented in different directions, and the processor may select at least one of the vision data captured by each of the plurality of cameras according to the position of the identified target and perform the guidance process based on the selected vision data.

The camera may include a telephoto camera and a wide-angle camera, and the processor may identify the target by selecting one of the telephoto camera and the wide-angle camera based on the distance to the target.

Additionally, the processor may identify the target using the wide-angle camera when the distance to the target is equal to or greater than a predefined first threshold distance, and when the target tracking device approaches the target such that the distance to the target falls below the first threshold distance, the processor may identify the target using the telephoto camera.

Furthermore, the processor may identify the target using the wide-angle camera when the target tracking device approaches the target and the distance to the target falls below a second threshold distance, which is smaller than the first threshold distance, or when the proportion occupied by the target within the vision data exceeds a predefined ratio.

Additionally, the processor may perform a first guidance process for tracking the target in a certain manner at a first tracking time point and perform a second guidance process for tracking the target in a manner different from the certain manner at a second tracking time point, which is temporally later than the first tracking time point.

Furthermore, in the first guidance process, the processor may control the target tracking device to track the target at a predefined separation distance.

Additionally, in the first guidance process, the processor may perform the first guidance process based on at least one of radar data acquired through a radar and the vision data.

Furthermore, in the first guidance process, the processor may recognize an identification ID assigned to each target included in the radar data, track the target corresponding to the identification ID based on the identification ID, and verify the identification ID assigned to the target by comparing target trajectory prediction data generated using a pre-trained trajectory prediction model with current position information of the target included in the radar data.

Additionally, the processor may transition from the first guidance process to the second guidance process based on at least one of the recognition accuracy probability output by the detection model, the distance between the target tracking device and the target, and a control command received from a control device linked to the target tracking device.

Furthermore, in the second guidance process, the processor may set a flight trajectory to approach the identified target from below.

Additionally, the target tracking device may further include a propeller capable of changing a pitch angle.

Additionally, the camera may be mounted on a mounting part included in the target tracking device, and the mounting part may include a gimbal capable of angle adjustment.

A target tracking system for tracking a target according to some embodiments of the present disclosure includes at least one target tracking device for tracking the target and a control device for controlling the target tracking device, wherein the target tracking device includes a memory storing at least one instruction and at least one processor executing the at least one instruction, and the processor identifies the target based on vision data acquired through a camera included in the target tracking device and performs a guidance process to approach the identified target, wherein the vision data includes at least one of Electro-Optical (EO) images and Infrared (IR) images, and the processor may identify the target from the vision data based on at least one of a preprocessed image, which is a result of preprocessing the EO image, and the IR image, and a pre-trained detection model.

Additionally, the target tracking system may further include a radar device that generates radar data related to the position of the target through a radar, and the control device may further control the radar device. The processor may perform the guidance process based on at least one of the radar data and the vision data.

Furthermore, the target tracking device may include a plurality of target tracking devices, and each of the plurality of target tracking devices may perform the guidance process.

Additionally, the plurality of target tracking devices may include a first target tracking device and a second target tracking device, and when the first target tracking device performs the guidance process, the second target tracking device may return according to a return trajectory if the first target tracking device collides with the target according to the guidance process. If the first target tracking device fails to collide with the target, the second target tracking device may perform the guidance process.

Additionally, the second target tracking device may fly in a battery-saving mode while the first target tracking device performs the guidance process.

Furthermore, the target may include a plurality of targets, and the target for which each of the plurality of target tracking devices performs the guidance process may be individually assigned among the plurality of targets.

Additionally, the target tracking system may further include a jammer for providing radio frequency (RF) interference to at least one of the plurality of targets, and the target for which each of the plurality of target tracking devices performs the guidance process may be individually assigned among the targets that have not been affected by the RF interference.

Furthermore, the target tracking system may further include a reconnaissance device for identifying the position of the target, and the target tracking device may perform the guidance process under the control of the reconnaissance device.

Advantageous Effects

A target tracking device and a system including the same according to some embodiments of the present disclosure may overcome the limitations of the soft kill method, which has been used as a conventional anti-drone method, by performing a precise hard kill on a target, including threat drones and illegal drones. That is, the target tracking device and the system including the same according to some embodiments of the present disclosure may ensure response completeness against threat drones and illegal drones by determining the position of a target and directly striking the target according to the determined position.

Additionally, the target tracking device and the system including the same according to some embodiments of the present disclosure may achieve sufficient economic feasibility by integrating hardware performance enabling high-speed movement, control performance secured through a position correction process based on sensing data (e.g., gyroscope data) obtained during the high-speed movement process, and AI performance for automation (e.g., a detection model) in the target tracking process. In particular, the target tracking device and the system including the same according to some embodiments of the present disclosure may further enhance economic feasibility through cluster operation that integrates and operates a radar device, a control device, and a target tracking device, a structure equipped with multiple cameras, and a launcher that prevents the shaking of the target tracking device during initial flight and has package functionality.

Additionally, the target tracking device and the system including the same according to some embodiments of the present disclosure may be universally applicable to sites where various threats occur, allowing flexible utilization according to the operational environment. In particular, the target tracking device and the system including the same according to some embodiments of the present disclosure may enable various types and ranges of operations, including aerial strikes, ground strikes, and swarm strikes, through cluster operation that integrates and operates a radar device, a control device, and a target tracking device.

Along with the above description, the specific effects of some embodiments of the present disclosure will be described in conjunction with the detailed description of the embodiments for implementing the present disclosure.

BRIEF DESCRIPTION OF THE DRAWINGS

FIG. 14 is a diagram illustrating a target tracking system according to some other embodiments of the present disclosure.

FIG. 17 is a diagram illustrating a target tracking system according to some other embodiments of the present disclosure.

DETAILED DESCRIPTION

Figure 1:
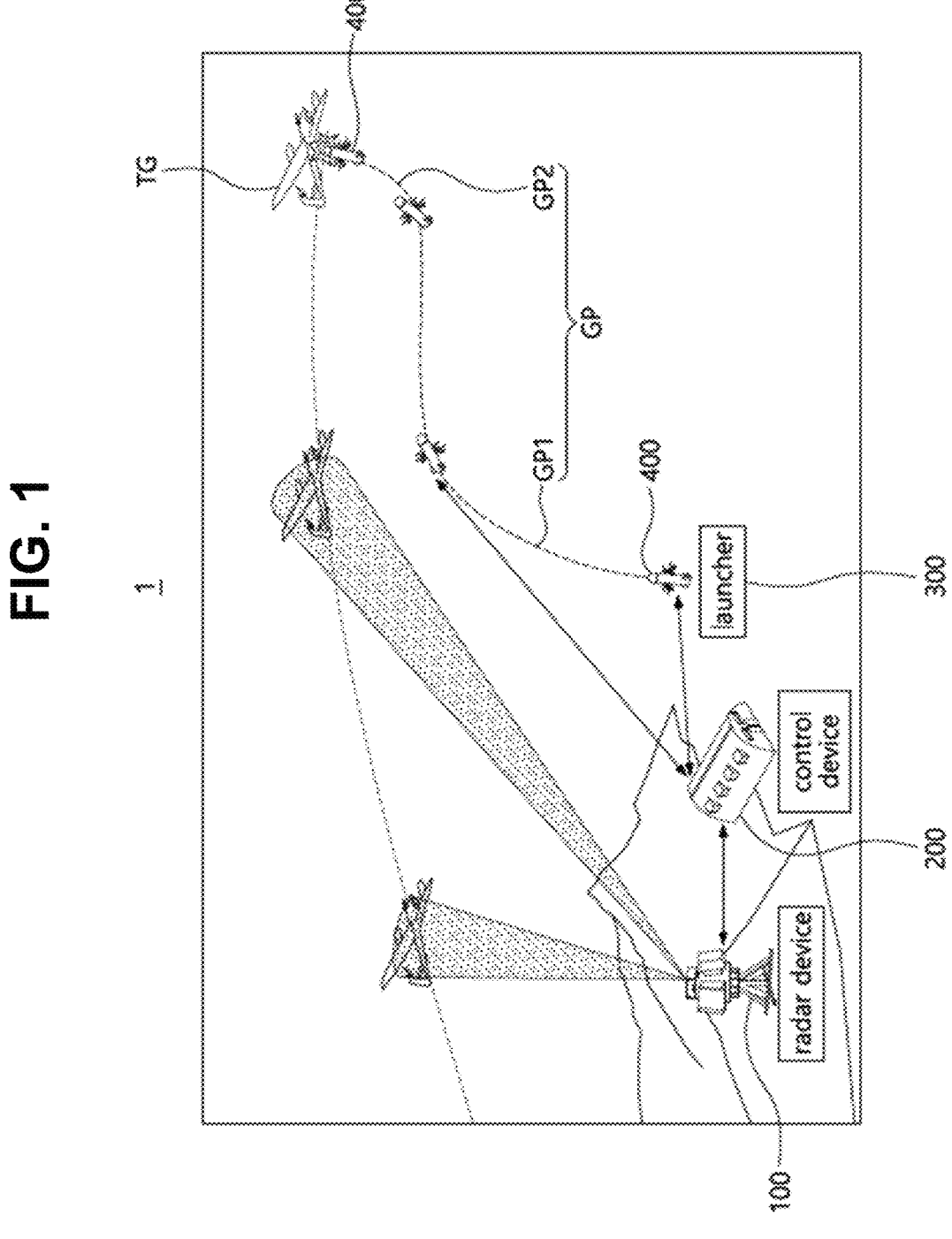
FIG. 1 is a diagram for explaining a target tracking system according to some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Furthermore, each component, process, step, or method included in each embodiment of the present disclosure may be shared within a technically non-contradictory range.

Hereinafter, a target tracking device and a system including the same according to some embodiments of the present disclosure will be described with reference to FIGS. 1 to 17.

FIG. 1 is a diagram for explaining a target tracking system according to some embodiments of the present disclosure.

Referring to FIG. 1, a target tracking system 1 according to some embodiments of the present disclosure is a system for tracking a target (hereinafter referred to as TG) and may include a radar device 100, a control device 200, a launcher 300, and a target tracking device 400.

The target TG may include a moving object moving at a predefined speed and a stationary object fixed at a specific position. The moving object may include an aerial vehicle flying at a predefined altitude or higher, a ground vehicle present on the ground, and an underwater vehicle present in the water; however, embodiments of the present disclosure are not limited thereto.

The radar device 100 may track the position of the target TG through radar. In other words, the radar device 100 may generate radar data by detecting the target TG using radar.

In some examples, the radar device 100 may generate radar data by transmitting signals, including electromagnetic waves and microwaves, within a predefined area and receiving signals reflected by the target TG. At this time, the radar device 100 may calculate the distance to the target TG by measuring the time delay of the signals received from the target TG and measure the movement speed of the target TG by measuring the frequency shift of the received signals (Doppler Shift).

The radar data generated by the radar device 100 may include the position information of the target TG, the distance between the radar device 100 and the target TG, the angle between the radar device 100 and the target TG, the altitude of the target TG, the movement speed of the target TG, and the identification ID assigned to each target TG.

The control device 200 may control the radar device 100, the target tracking device 400, and other components. The control device 200 may also be referred to as a Ground Control System (GCS).

In some examples, the control device 200 may control the radar device 100. For example, the control device 200 may control the radar device 100 to generate radar data.

In other examples, the control device 200 may control the target tracking device 400. For example, the control device 200 may control the target tracking device 400 to identify the target TG and perform a guidance process to approach the identified target TG. In one example, the control device 200 may control the target tracking device 400 to perform the guidance process to approach the target TG based on radar data generated by the radar device 100, sensing data generated by the target tracking device 400, and vision data.

Meanwhile, the control device 200 may include a control server for controlling the radar device 100 and/or the target tracking device 400, as well as a controller operable by an administrator of the target tracking system 1.

The launcher 300 is a device that assists in launching the target tracking device 400. In other words, the target tracking device 400 may be stored in the launcher 300 and launched externally.

Power may be supplied to the launcher 300. In one example, the launcher 300 may include an actuator for opening a door to enable the launch of the target tracking device 400 under the control of the control device 200, a fan for controlling the inflow and outflow of air through a flow path, and a communication module (communication interface) for performing wired or wireless communication with the control device 200. Power may be supplied to these components, including the actuator, fan, and communication module.

In some examples, the launcher 300 may include a vehicle launcher, an aerial launcher, and a ground launcher. The vehicle launcher is a device in the form of a vehicle that assists in launching the target tracking device 400, the aerial launcher is a device in the form of an aerial vehicle that assists in launching the target tracking device 400, and the ground launcher is a device attached or deployed on the ground that assists in launching the target tracking device 400. However, embodiments of the present disclosure are not limited thereto, and the target tracking device 400 of the present disclosure may also be manually launched by an administrator of the target tracking system 1 or other personnel.

Hereinafter, with reference to FIGS. 2a to 4b, a more detailed description will be provided regarding the launch of the target tracking device 400 according to some embodiments of the present disclosure.

Figure 2A:
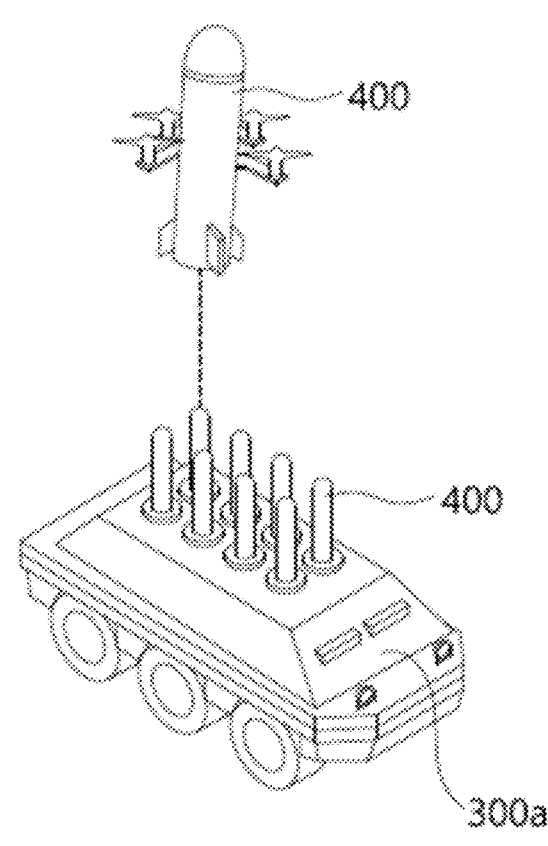
FIGS. 2a to 2c illustrate the launch process of a target tracking device according to some embodiments of the present disclosure.
Figure 2B:
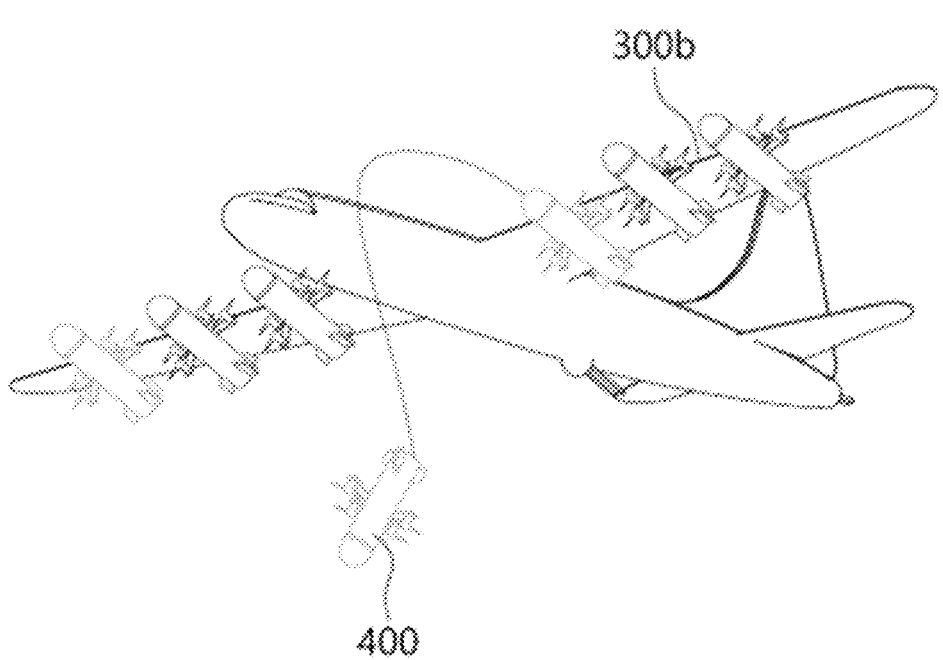
Figure 2C:
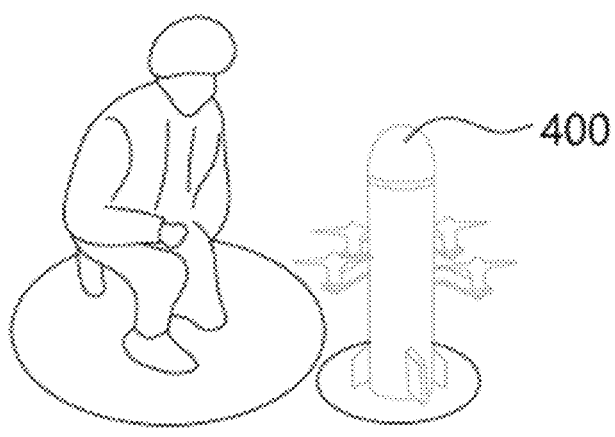

FIGS. 2a to 2c illustrate the launch process of a target tracking device according to some embodiments of the present disclosure.

Referring to FIG. 1 and FIGS. 2a to 2c, the launcher 300 according to some embodiments of the present disclosure may be launched from a vehicle launcher 300a and/or an aerial launcher 300b, or it may be manually launched by an administrator of the target tracking system 1.

In some examples, as shown in FIG. 2a, the launcher 300 according to some embodiments of the present disclosure may include a vehicle launcher 300a. The vehicle launcher 300a may be a device in the form of a vehicle that assists in launching the target tracking device 400. At this time, the vehicle launcher 300a may include a main body that comprises wheels in contact with the ground and a housing section arranged on the upper or side surface of the main body to accommodate the target tracking device 400.

In other examples, as shown in FIG. 2b, the launcher 300 according to some embodiments of the present disclosure may include an aerial launcher 300b. The aerial launcher 300b may be a device in the form of an aerial vehicle (e.g., an airplane) that assists in launching the target tracking device 400. At this time, the aerial launcher 300b may include a main body that contains propellers or other components for flight, and a housing section arranged on one surface of the main body to accommodate the target tracking device 400.

In other examples, as shown in FIG. 2c, the target tracking device 400 may also be manually launched by an administrator of the target tracking system 1 or other personnel. In other words, in the target tracking system 1 of the present disclosure, the launcher 300 may be omitted, in which case the target tracking device 400 may be directly launched by the administrator of the target tracking system 1.

Figure 3A:
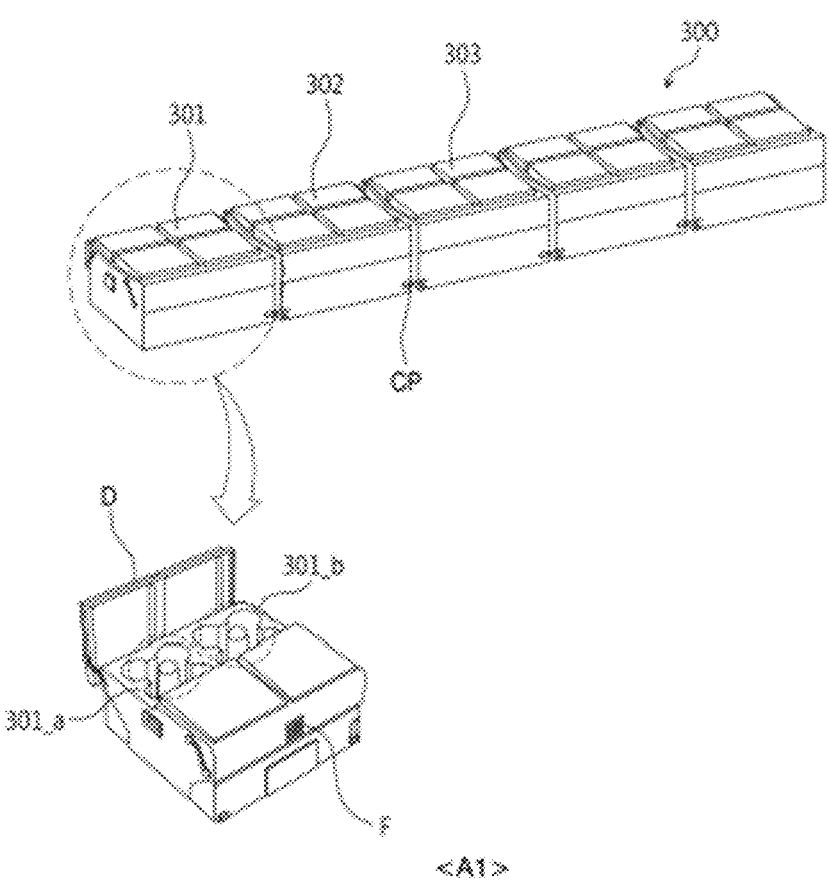
FIG. 3a is a diagram for explaining a sub-launcher and a fan included in a launcher according to some embodiments of the present disclosure.
Figure 3A:
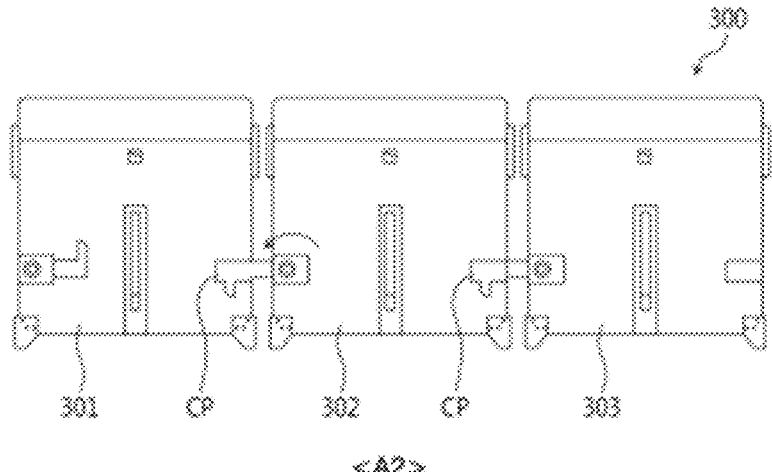
Figure 3B:
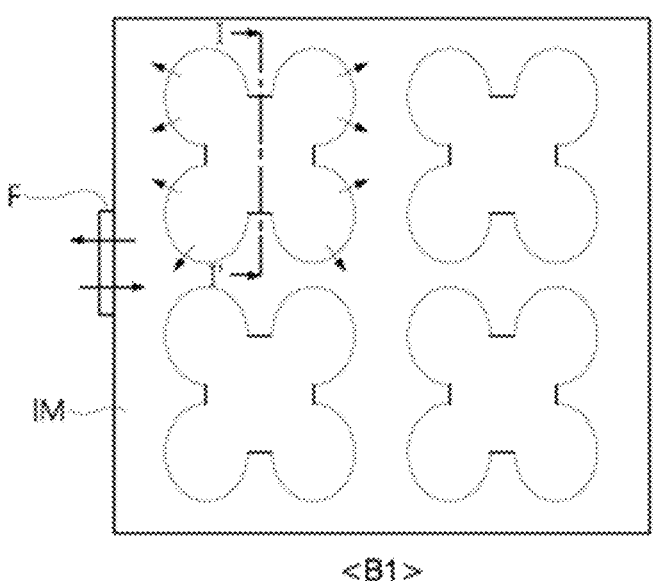
FIG. 3b is a diagram for explaining the operation of a fan according to some embodiments of the present disclosure.
Figure 3B:
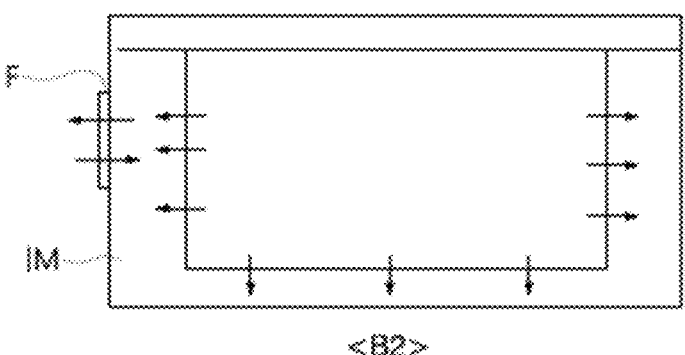

FIG. 3a is a diagram for explaining a sub-launcher and a fan included in a launcher according to some embodiments of the present disclosure. FIG. 3b is a diagram for explaining the operation of a fan according to some embodiments of the present disclosure. Specifically, in FIG. 3a, <A1> illustrates a perspective view of the launcher 300 according to some embodiments of the present disclosure and an enlarged view of an individual launcher, while <A2> illustrates a front view of the launcher 300 according to some embodiments of the present disclosure. In FIG. 3b, <B1> illustrates the air inflow and outflow process in the launcher 300 according to some embodiments of the present disclosure from a top view, while <B2> illustrates the air inflow and outflow process in the launcher 300 from a front view.

At this time, FIGS. 3a and 3b illustrate a ground launcher as a type of launcher 300. The ground launcher may be configured to assist in launching the target tracking device 400 in a form that is deployed on the ground. At this time, the ground launcher may include a main body having a grounding surface in contact with the ground, and a housing section arranged on the upper or side surface of the main body to accommodate the target tracking device 400.

Referring to FIG. 1, FIG. 3a, and FIG. 3b, the launcher 300 according to some embodiments of the present disclosure may be a combined structure in which a plurality of individual launchers 301 to 303 are assembled together. In other words, the launcher 300 may be a collection of individual launchers 301 to 303.

At this time, the individual launchers 301 to 303 may include an attachment structure (e.g., hooks, grooves, etc.) that allows them to be fastened to each other. In other words, the launcher 300 may include a connecting part (hereinafter referred to as "CP") for interconnecting the individual launchers 301 to 303. At this time, as illustrated in FIG. 3a <A2>, the connecting part CP may be attached to one of the individual launchers (e.g., 302) and rotated to be fastened into a groove formed in another individual launcher (e.g., 301), thereby interconnecting the individual launchers 301 to 303.

The individual launchers 301 to 303 may include sub-launchers. As an example, FIG. 3a illustrates a first sub-launcher 301_a and a second sub-launcher 301_b included in the first individual launcher 301. For convenience of explanation, FIG. 3a depicts the first individual launcher 301 as including a total of four sub-launchers; however, embodiments of the present disclosure are not limited thereto.

Meanwhile, the launcher 300 may include a fan (hereinafter referred to as "F"). The fan F may control the inflow and outflow of air through an airflow path formed in an inner part (hereinafter referred to as "IP"), thereby cooling the interior of the launcher 300 and minimizing the effect of lift on the target tracking device 400. In other words, the fan F may perform an air control process through the airflow path formed in the inner part IP. At this time, the inner part IP may be formed, configured, and/or manufactured from a material for forming the airflow path, such as Expanded Polypropylene (EPP) foam; however, embodiments of the present disclosure are not limited thereto. Meanwhile, the inner part IP may also serve to protect the launcher 300 from external impacts.

Although FIG. 3b, <B1> and <B2> illustrate the process of air inflow and outflow controlled by the fan F through the airflow path formed in the inner part IP, embodiments of the present disclosure are not limited thereto.

Meanwhile, power may be supplied to the launcher 300. In one example, the launcher 300 may include an actuator for opening a door (hereinafter referred to as "D") to enable the launch of the target tracking device 400 under the control of the control device 200, a fan F for controlling the inflow and outflow of air through the airflow path formed in the inner part IP, and a communication module for performing wired or wireless communication with the control device 200. Power may be supplied to these components, including the actuator, fan F, and communication module. For convenience of explanation, FIG. 3a illustrates the door D as being formed on the upper surface of the individual launchers 301 to 303; however, embodiments of the present disclosure are not limited thereto, and the door D may also be arranged and formed on the side or front surface of each individual launcher 301 to 303. Additionally, components such as the actuator and communication module may be embedded inside each individual launcher 301 to 303.

FIGS. 4a to 4d are diagrams for explaining the guide line included in a launcher according to some embodiments of the present disclosure.

Referring to FIG. 1 and FIGS. 4a to 4d, the launcher 300 according to some embodiments of the present disclosure may include a guide line (hereinafter referred to as "GL") that assists in the takeoff of the target tracking device 400. In other words, the guide line GL may be included in a vehicle launcher or an aerial launcher, as described in FIGS. 2a and 2b, or in a ground launcher, as described in FIGS. 3a and 3b.

During takeoff, the target tracking device 400 may experience significant shaking until it reaches a critical speed. Accordingly, the launcher 300 according to some embodiments of the present disclosure may include the guide line GL to assist in the initial takeoff of the target tracking device 400, thereby ensuring a safe and precise takeoff.

Figure 4A:
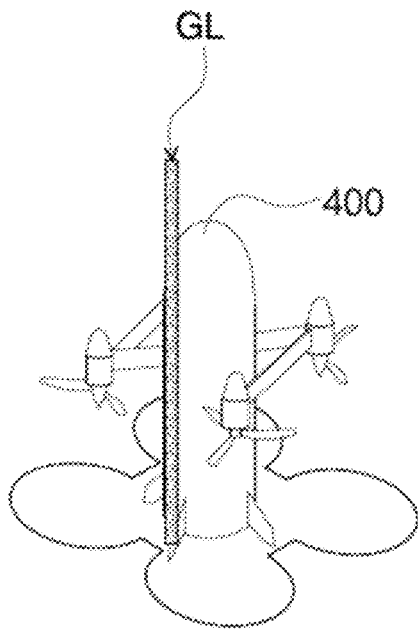
FIGS. 4a to 4d are diagrams for explaining the guide line included in a launcher according to some embodiments of the present disclosure.
Figure 4A:
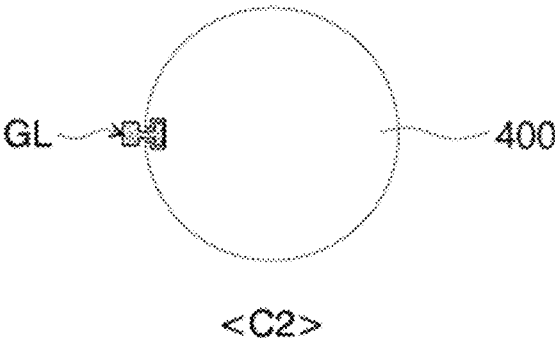

In some examples, as shown in FIG. 4a, the guide line GL included in the launcher 300 according to some embodiments of the present disclosure may have a pillar shape. FIG. 4a, <C1> illustrates a perspective view of the combination of the pillar-shaped guide line GL and the target tracking device 400, while FIG. 4a, <C2> illustrates a top view of the combination of the pillar-shaped guide line GL and the target tracking device 400. For convenience of explanation, FIG. 4a, <C1> and <C2> depict the target tracking device 400 combined with a single guide line GL; however, embodiments of the present disclosure are not limited thereto, and the guide line GL may include a plurality of pillar-shaped structures combined at different positions of the target tracking device 400. At this time, as shown in FIG. 4a, <C2>, the target tracking device 400 may include a groove for coupling with the guide line GL. Meanwhile, the height of the guide line GL may be greater than the height of the target tracking device 400. However, the height of the guide line GL does not necessarily have to be greater than the height of the target tracking device 400.

Figure 4B:
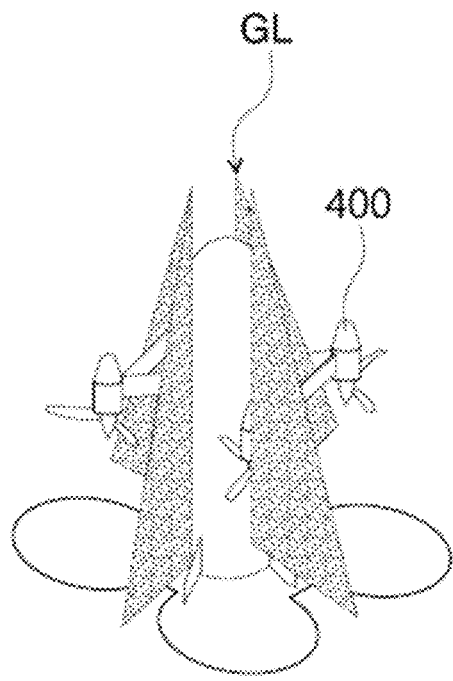

In other examples, as shown in FIG. 4b, the guide line GL included in the launcher 300 according to some embodiments of the present disclosure may have a triangular shape. For example, FIG. 4b illustrates the target tracking device 400 combined with four triangular guide lines GL; however, embodiments of the present disclosure are not limited thereto, and the number of triangular guide lines GL may be freely modified. At this time, the target tracking device 400 may include a groove for coupling with the triangular guide line GL. Meanwhile, the height of the guide line GL may be greater than the height of the target tracking device 400. However, the height of the guide line GL does not necessarily have to be greater than the height of the target tracking device 400.

Figure 4C:
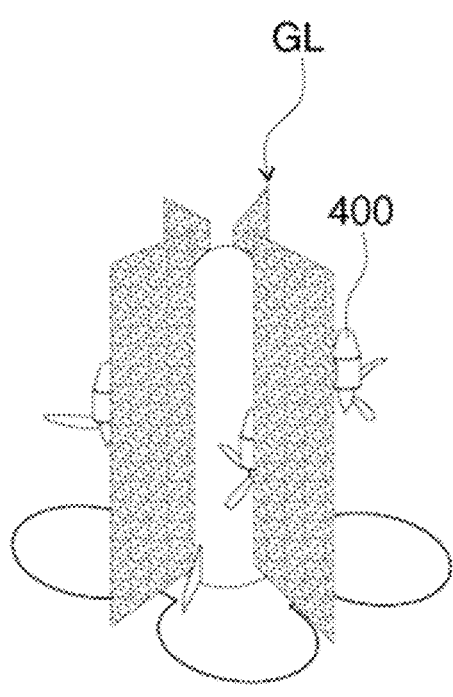

In other examples, as shown in FIG. 4c, the guide line GL included in the launcher 300 according to some embodiments of the present disclosure may have a rectangular shape. For example, FIG. 4c illustrates the target tracking device 400 combined with four rectangular guide lines GL; however, embodiments of the present disclosure are not limited thereto, and the number of rectangular guide lines GL may be freely modified. At this time, the target tracking device 400 may include a groove for coupling with the rectangular guide line GL. Meanwhile, the height of the guide line GL may be greater than the height of the target tracking device 400. However, the height of the guide line GL does not necessarily have to be greater than the height of the target tracking device 400.

Figure 4D:
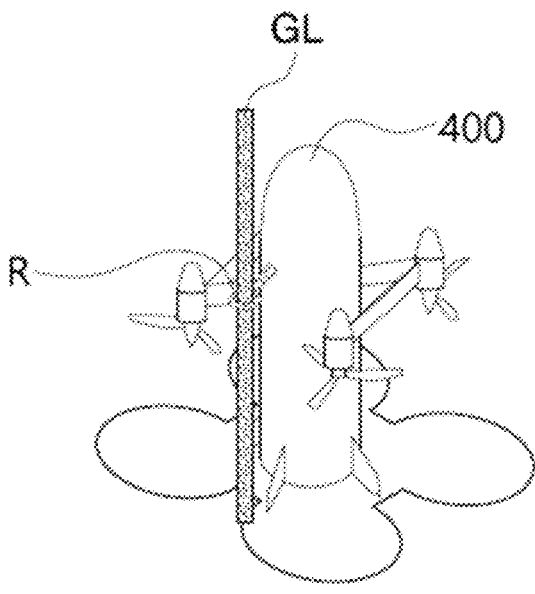

In other examples, as shown in FIG. 4d, the guide line GL included in the launcher 300 according to some embodiments of the present disclosure may include a ring (hereinafter referred to as "R") for assisting in the connection with the target tracking device 400. At this time, the ring R may serve to physically connect the guide line GL and the target tracking device 400. For example, FIG. 4d illustrates a case where the number of rings R is one; however, embodiments of the present disclosure are not limited thereto, and the number of rings R included in the guide line GL may be freely modified.

Referring again to FIG. 1, the target tracking device 400 may include an object that moves along the ground, water, or airspace. In one example, the target tracking device 400 may include an aerial vehicle. At this time, the aerial vehicle may include any type of flying craft, such as a drone, an Unmanned Aerial Vehicle (UAV), an Unmanned Aerial Mobility (UAM), an aircraft, or a helicopter. Hereinafter, for convenience of explanation, the target tracking device 400 will be described assuming that it is an aerial vehicle.

The target tracking device 400 may fly independently or in collaboration with multiple target tracking devices capable of cooperative operation. Additionally, the target tracking device 400 may collaborate with other types of devices, such as vehicles or robots.

In some examples, the target tracking device 400 may be launched and take off from the launcher 300 to track the target TG. In other words, after taking off from the launcher 300, the target tracking device 400 may perform a guidance process to approach the target TG.

At this time, the target tracking device 400 may automatically perform the guidance process to approach the target TG based on radar data generated by the radar device 100, and vision data captured by a camera included in the target tracking device 400. Alternatively, it may perform the guidance process under user control to approach the target TG. When performing the guidance process to approach the target TG under user control, the control device 200 may provide the user with a First Person View (FPV) video feed.

Hereinafter, with reference to FIGS. 5 to 13, a more detailed description of the target tracking device 400 according to some embodiments of the present disclosure will be provided.

Figure 5:
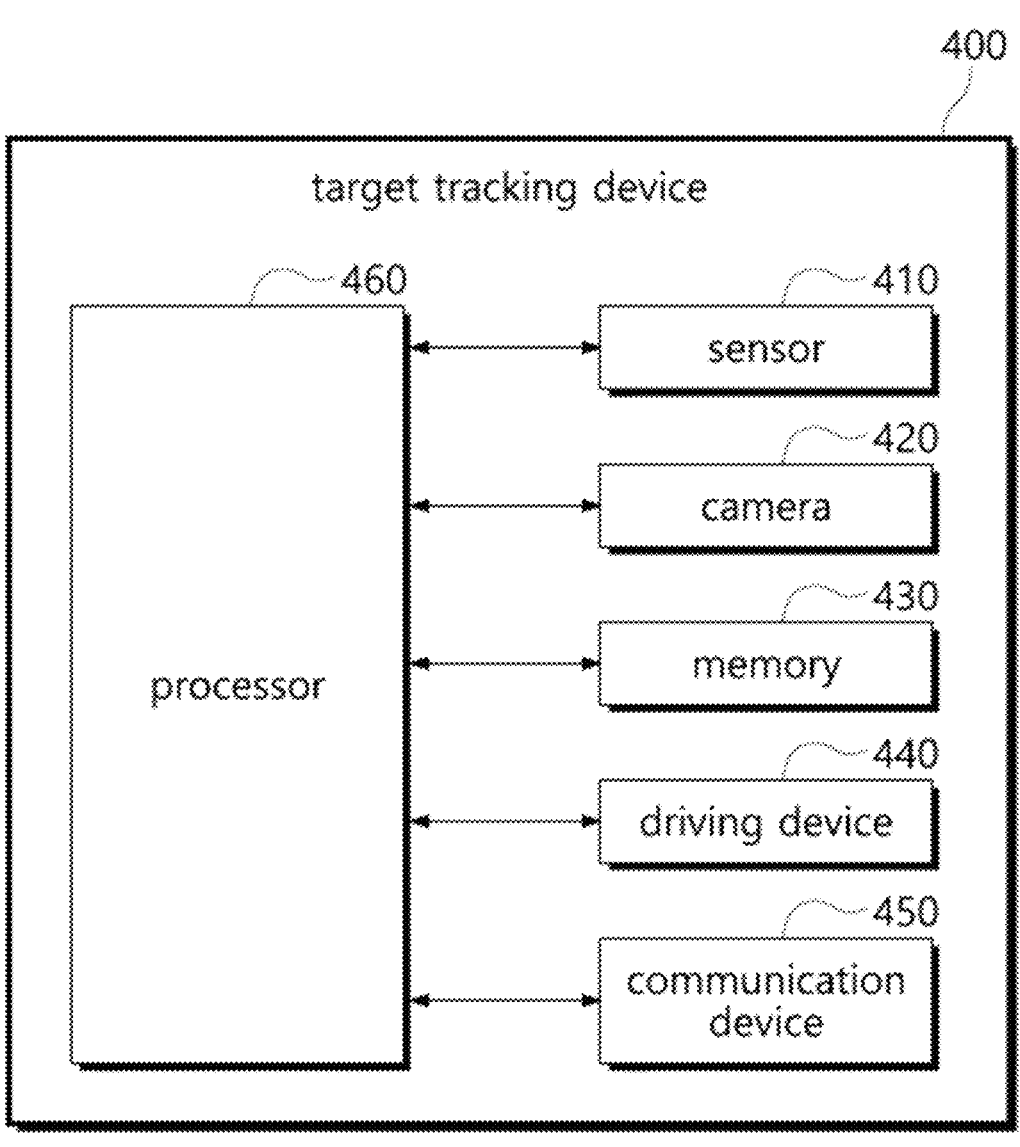
FIG. 5 is a block diagram of a target tracking device according to some embodiments of the present disclosure.
Figure 6:
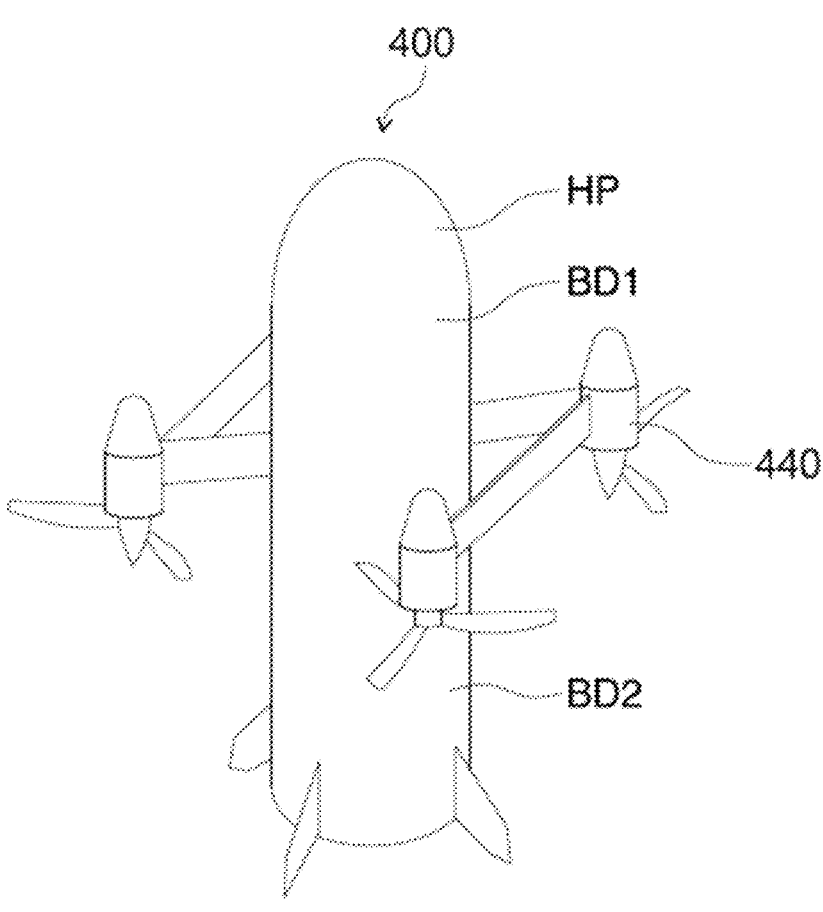
FIG. 6 is a conceptual diagram of a target tracking device according to some embodiments of the present disclosure.
Figure 7:
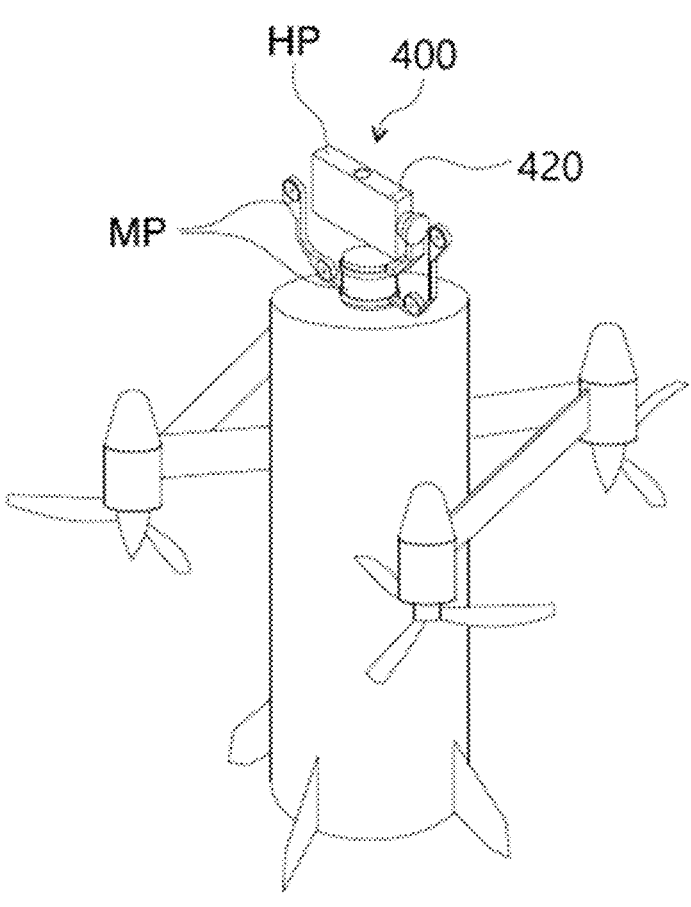
FIG. 7 is a diagram for explaining a mounting part according to some embodiments of the present disclosure.
Figure 8:
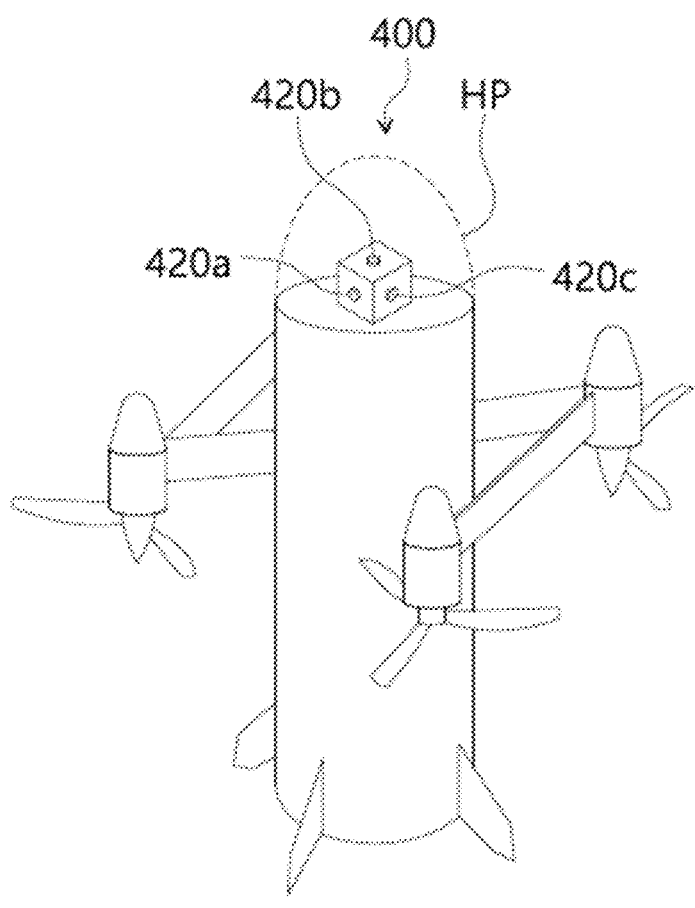
FIG. 8 is a diagram for explaining a plurality of cameras according to some embodiments of the present disclosure.
Figure 9:
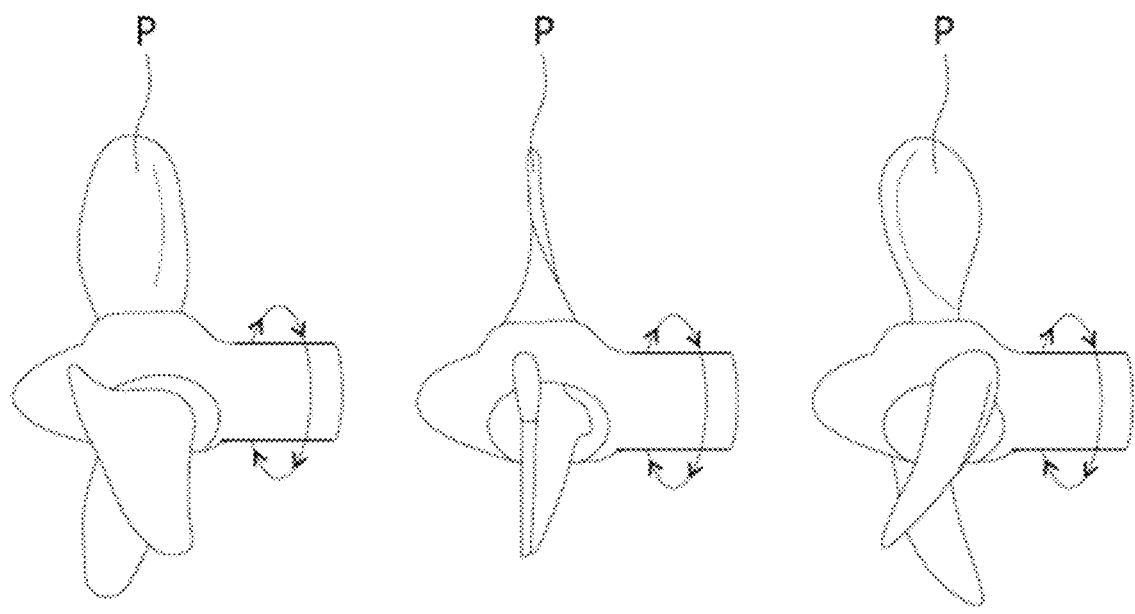
FIG. 9 is a diagram for explaining a driving device according to some embodiments of the present disclosure.

FIG. 5 is a block diagram of a target tracking device according to some embodiments of the present disclosure. FIG. 6 is a conceptual diagram of a target tracking device according to some embodiments of the present disclosure. FIG. 7 is a diagram for explaining a mounting part according to some embodiments of the present disclosure. FIG. 8 is a diagram for explaining a plurality of cameras according to some embodiments of the present disclosure. FIG. 9 is a diagram for explaining a driving device according to some embodiments of the present disclosure.

Referring to FIGS. 1 and 5, the target tracking device 400 according to some embodiments of the present disclosure may include a sensor 410, a camera 420, a memory 430, a driving device 440, a communication device 450, and a processor 460. However, the components of the target tracking device 400 are not limited to those illustrated in FIG. 5. In other words, the target tracking device 400 may include at least one additional component other than those shown in FIG. 5, or at least one of the components shown in FIG. 5 may be omitted.

Additionally, referring to FIGS. 1, 5, and 6, the target tracking device 400 according to some embodiments of the present disclosure may include a head part (hereinafter referred to as "HP"), a body (hereinafter referred to as "BD") connected to the head part HP, and a driving device 440 connected to the body BD. The body BD may include a first body BD1 and a second body BD2.

At this time, the sensor 410, memory 430, communication device 450, and processor 460 in FIG. 5 may be embedded in the first body BD1; however, embodiments of the present disclosure are not limited thereto, and the sensor 410, memory 430, communication device 450, and processor 460 may also be embedded in the second body BD2. Additionally, the camera 420 may be embedded in the head part HP.

The sensor 410 may detect various types of information necessary for the operation of the target tracking device 400 (e.g., flight, imaging, etc.), such as information regarding the target tracking device 400 itself, its surrounding environment, the identification of the target TG, and the distance between the target tracking device 400 and the target TG. In one example, the sensor 410 may include at least one of a gyro sensor, a Global Positioning System (GPS) sensor, an acceleration sensor, a barometer, an ultrasonic sensor, a magnetic sensor, a proximity sensor, a LiDAR, and/or a radar; however, embodiments of the present disclosure are not limited thereto.

For example, the gyro sensor and/or acceleration sensor may measure the three-axis angular velocity of the target tracking device 400. The barometer may measure the atmospheric pressure changes and/or pressure around the target tracking device 400. The ultrasonic sensor may measure the distance between the target tracking device 400 and the ground or the target TG. The magnetic sensor, which is a type of terrestrial magnetism sensor (compass sensor), may detect geomagnetic information. The proximity sensor may detect the proximity state of the target TG relative to the target tracking device 400 and measure the distance between the target tracking device 400 and the target TG. It may also include an ultrasonic sensor that outputs ultrasonic waves and measures the distance to the target TG based on signals reflected from the target TG. The GPS sensor may calculate the current coordinates (x, y, z) of the target tracking device 400 using GPS signals.

The sensor 410 may also include an Attitude and Heading Reference System (AHRS). For example, the attitude and heading reference system may include an inertial sensor or an inertial measurement unit (IMU). For example, the attitude and heading reference system may include a gyro sensor, an acceleration sensor, and a magnetic sensor, and may fuse sensor values to output the attitude values ($\varphi$, $\tilde{O}$, $\theta$, $\psi$) of the target tracking device 400. Here, the attitude values ($\varphi$, $\tilde{O}$, $\theta$, $\psi$) may be angles based on three-dimensional coordinates (x-axis coordinate, y-axis coordinate, z-axis coordinate) according to GPS coordinates.

The camera 420 may capture the target TG according to instructions from the processor 460. In other words, the camera 420 may capture the target TG to generate vision data. At this time, the camera 420 may include an Electro-Optical (EO) camera and/or an Infrared (IR) camera. The camera 420 may include a wide-angle lens and/or a telephoto lens.

In some examples, the camera 420 may be embedded in the head part HP. In other words, the camera 420 may be arranged in a certain region inside the head part HP.

Referring to FIGS. 1, 5, 6, and 7, the camera 420 according to some embodiments of the present disclosure may be embedded in the head part HP, which may be seated on a mounting part MP connected to the first body BD1 of the target tracking device 400. At this time, the mounting part MP may include a gimbal capable of angle adjustment. In FIG. 7, the gimbal is illustrated as supporting the head part HP from both sides; however, embodiments of the present disclosure are not limited thereto. Accordingly, the camera 420 may have its shooting angle adjusted by the mounting part MP. By using such a rotatable mounting part MP, flexibility in the tracking flight process of the target tracking device 400 for the target TG may be secured. Additionally, the mounting part MP may minimize the transmission of vibrations from the body BD of the target tracking device 400 to the camera 420, enabling the target tracking device 400 to perform its mission more stably and effectively. In other words, by supporting the head part HP, in which the camera 420 is embedded, the mounting part MP may maintain the camera 420 in a stable and fixed position even if vibrations or shaking occur during the flight of the target tracking device 400.

Meanwhile, referring to FIGS. 1, 5, 6, and 8, the camera 420 may include a plurality of cameras 420a, 420b, and 420c. At this time, the plurality of cameras 420a, 420b, and 420c may be any one of a wide-angle camera, a telephoto camera, a low-resolution camera, and/or a high-resolution camera; however, embodiments of the present disclosure are not limited thereto. At this time, as shown in FIG. 8, the plurality of cameras 420a, 420b, and 420c may capture images in different directions. In other words, the directions in which the plurality of cameras 420a, 420b, and 420c are oriented may be different from one another.

The control and operation of the plurality of cameras 420a, 420b, and 420c may be performed by the processor 460. For example, the processor 460 may select which camera to activate among the plurality of cameras 420a, 420b, and 420c based on the position information of the target TG received from the radar device 100.

For instance, the processor 460 may select vision data for tracking the target TG from among the vision data captured by the plurality of cameras 420a, 420b, and 420c based on the position information of the target TG received from the radar device 100. In other words, in the first guidance process and the second guidance process, as described later, the processor 460 may identify and track the position of the target TG by using the vision data captured by a camera (e.g., 420a) among the plurality of cameras 420a, 420b, and 420c that is oriented toward the position of the target TG received from the radar device 100.

Referring again to FIGS. 1 and 5, the memory 430 may include any non-transitory computer-readable recording medium. In one example, the memory 430 may include a permanent mass storage device, such as random access memory (RAM), read-only memory (ROM), a disk drive, a solid-state drive (SSD), or flash memory. In another example, permanent mass storage devices such as ROM, SSD, flash memory, and disk drives may be separate permanent storage devices distinct from the memory. Additionally, an operating system (OS) and at least one program code may be stored in the memory 430. These software components may be loaded from a computer-readable recording medium separate from the memory 430. Such a separate computer-readable recording medium may be a recording medium that may be directly connected to a computer and may include, for example, computer-readable recording media such as a floppy drive, disk, tape, DVD/CD-ROM drive, or memory card. Alternatively, the software components may be loaded into the memory 430 via the communication device 150 instead of a computer-readable recording medium. For example, at least one program may be loaded into the memory 430 based on a computer program installed through files provided by a file distribution system that distributes installation files for developers or applications via the communication device 150.

The memory 430 may store commands, information, and/or data related to the operation of each component included in the target tracking device 400. In one example, the memory 430 may store instructions that allow the processor 460 to perform various operations described in this document when executed. In another example, the memory 430 may store various algorithms or models that may be used in the process of tracking the target TG by the target tracking device 400.

The driving device 440 may control the operation of the motor at a speed and direction according to the instructions of the processor 460, thereby controlling the rotation speed and direction of the propeller connected to the motor. For example, the driving device 440 may include a motor and a propeller.

Referring to FIGS. 1, 5, and 9, in one example, the propeller P included in the driving device 440 may have a variable pitch angle. At this time, as illustrated in FIG. 9, the propeller P of the present disclosure may have its pitch angle adjusted to forward, neutral, or backward. Through this, the target tracking device 400 according to some embodiments of the present disclosure may maintain RPM while securing thrust and controlling direction. In this embodiment, the pitch angle of the propeller P is exemplified as being adjustable to three angles: forward, neutral, and backward. However, the present disclosure is not limited thereto, and the pitch angle of the propeller P may be adjusted to any angle set by the user.

Referring again to FIGS. 1 and 5, the communication device 450 performs data communication between the target tracking device 400 and external devices. For example, the communication device 450 may communicate with the radar device 100, the control device 200, and other devices using various communication methods such as infrared communication, radio frequency (RF) communication, Wi-Fi communication, ZigBee communication, Bluetooth communication, laser communication, ultra-wideband (UWB) communication, LTE, 5G, 6G, and wireless LAN communication. However, the communication method employed in the communication device 450 is not limited to those described above.

The processor 460 may process commands of the computer program by performing basic arithmetic, logic, and input/output operations. Here, the commands may be provided from the memory 430 and/or the control device 200. The commands may also be referred to as "instructions," as described above. At this time, the processor 460 may be operatively connected to the memory 430 to perform the overall functions of the target tracking device 400. Additionally, the processor 460 may generally control the operation of other components included in the target tracking device 400.

The functions performed by each module included in the processor 460 may be executed by a single processor or by separate individual processors. The processor 460 may perform operations or data processing related to the control and/or communication of at least one other component of the target tracking device 400. Additionally, the processor 460 may be implemented as an array of multiple logic gates or as a combination of a general-purpose microprocessor and a memory storing programs executable by the microprocessor. For example, the processor 460 may include a general-purpose processor, a central processing unit (CPU), a microprocessor, a digital signal processor (DSP), a controller, a microcontroller, or a state machine. In some environments, the processor 460 may also include an application-specific integrated circuit (ASIC), a programmable logic device (PLD), or a field-programmable gate array (FPGA). For example, the processor 460 may refer to a combination of processing devices, such as a combination of a digital signal processor (DSP) and a microprocessor, a combination of multiple microprocessors, a combination of one or more microprocessors coupled with a DSP core, or any other such configuration.

The processor 460 may cause the target tracking device 400 to identify the position of the target TG and to perform a guidance process to approach the target TG according to the identified position of the target TG. In other words, the processor 460 may perform an identification process for identifying the position of the target TG and a movement process for approaching the identified position of the target TG.

Meanwhile, the guidance process performed by the processor 460 may also be implemented by a separate device. In one example, the guidance process of the processor 460 may be performed by the control device 200. At this time, when the guidance process for the target tracking device 400 to approach the target TG is performed by the control device 200, the target tracking device 400 may transmit vision data of the target TG to the control device 200.

However, for convenience of explanation, the following description assumes that the aforementioned operations are performed by the processor 460 rather than the control device 200. In other words, the subsequent description assumes that the guidance process, in which the target tracking device 400 recognizes the position of the target TG and approaches it, is performed by the processor 460 included in the target tracking device 400.

Hereinafter, with reference to FIGS. 4 to 11, a detailed operation process of a device for determining the position of the target tracking device 400 according to some embodiments of the present disclosure will be described.

Figure 10:
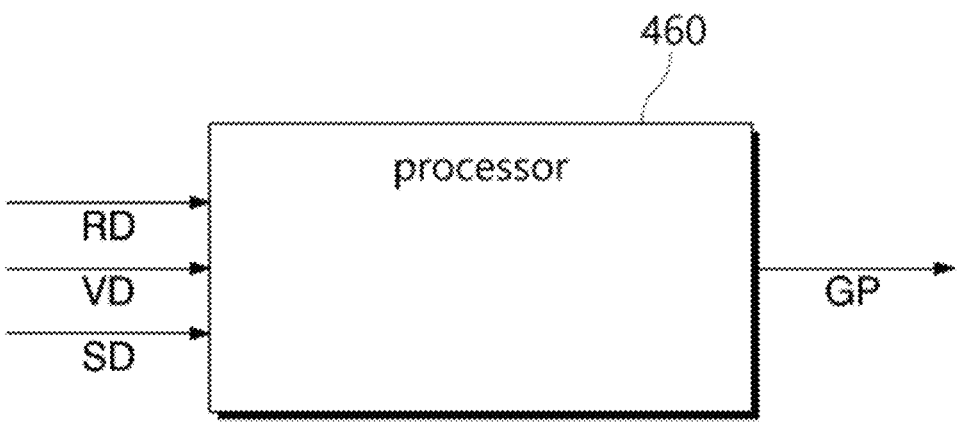
FIG. 10 is a diagram for explaining the operation of the processor according to some embodiments of the present disclosure.
Figure 11:
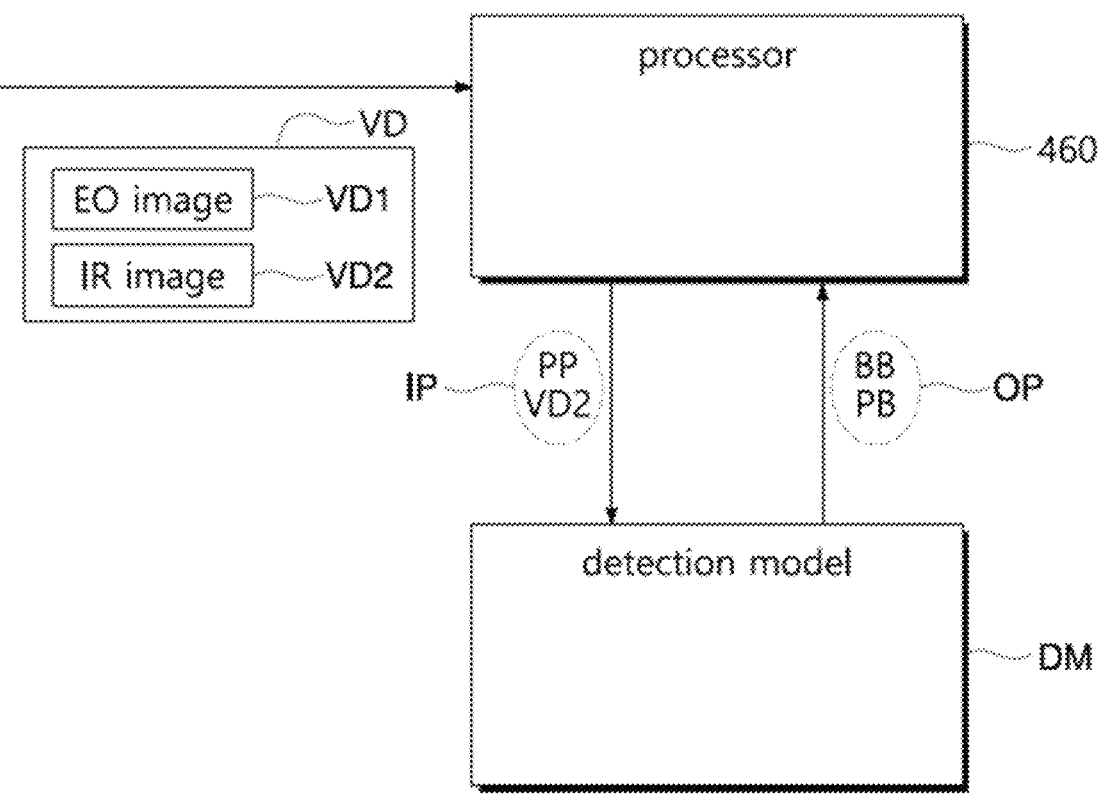
FIG. 11 is a diagram for explaining the detection process of the processor according to some embodiments of the present disclosure.
Figure 12:
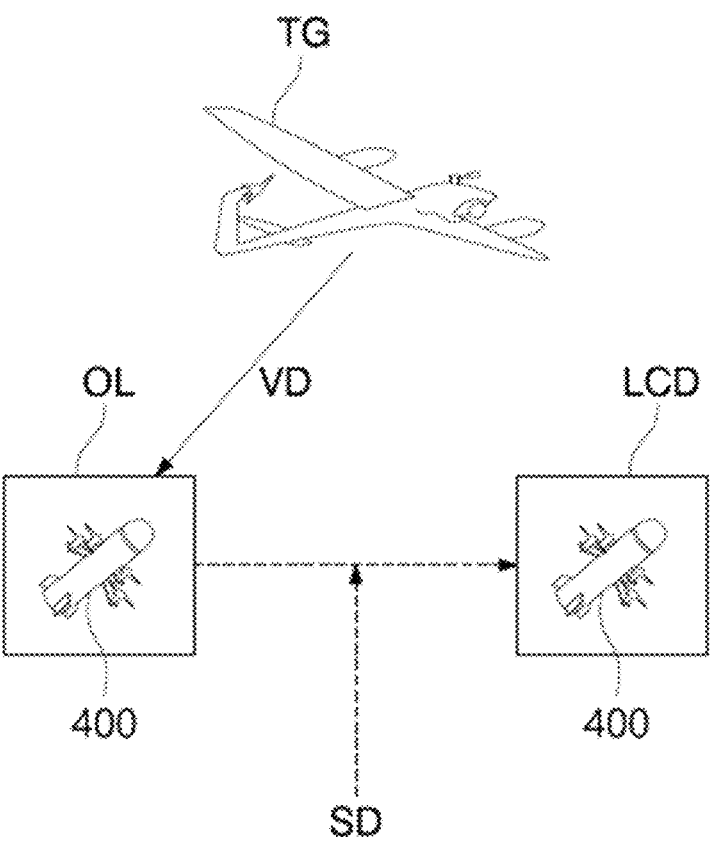
FIG. 12 is a diagram for explaining the position correction process of the processor according to some embodiments of the present disclosure.
Figure 13:
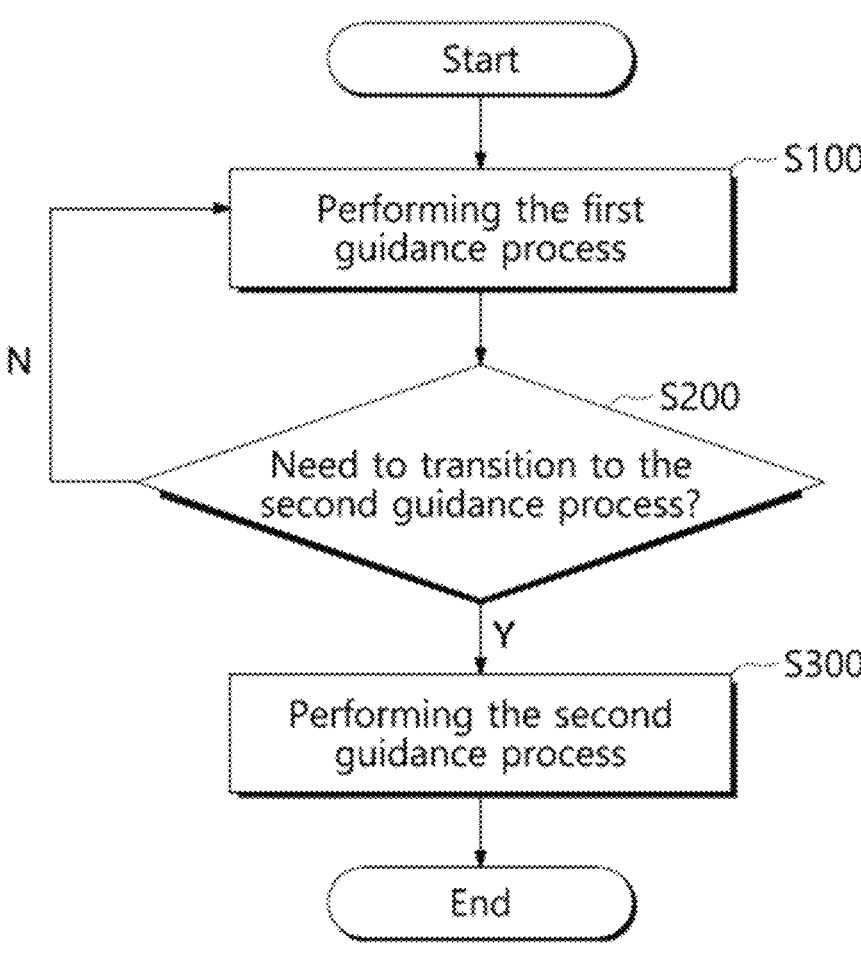
FIG. 13 is a flowchart for explaining the guidance process of the processor according to some embodiments of the present disclosure.

FIG. 10 is a diagram for explaining the operation of the processor according to some embodiments of the present disclosure. FIG. 11 is a diagram for explaining the detection process of the processor according to some embodiments of the present disclosure. FIG. 12 is a diagram for explaining the position correction process of the processor according to some embodiments of the present disclosure. FIG. 13 is a flowchart for explaining the guidance process of the processor according to some embodiments of the present disclosure.

Referring to FIGS. 1, 5, and 10, the processor 460 according to some embodiments of the present disclosure may identify the position of the target TG based on radar data (hereinafter referred to as "RD"), vision data (hereinafter referred to as "VD"), and sensing data (hereinafter referred to as "SD"), and then perform a guidance process (hereinafter referred to as "GP") to approach the target TG. In other words, the processor 460 may control the motor and propeller of the driving device 440 to perform guidance flight to approach the target TG based on radar data RD, vision data VD, and sensing data SD. At this time, as described later, the guidance process GP performed by the processor 460 may include a first guidance process GP1 and a second guidance process GP2.

In some examples, the processor 460 may perform guidance process GP based on radar data RD.

At this time, as previously described with reference to FIG. 1, the radar data RD may be generated by the radar device 100 and received via the communication device 450. However, embodiments of the present disclosure are not limited thereto, and the radar data RD may also be generated by a radar sensor or a LIDAR sensor included in the sensor 410. For convenience of explanation, the following description assumes that the radar data RD is generated by the radar device 100. As previously described in FIG. 1, the radar data RD generated by the radar device 100 may include the distance between the radar device 100 and the target TG, the angle between the radar device 100 and the target TG, the altitude of the target TG, and the movement speed of the target TG.

For example, the processor 460 may set a flight trajectory to approach the target TG based on the position information of the target TG included in the radar data RD. In other words, the processor 460 may perform the guidance process GP to approach the position of the target TG included in the radar data RD.

In other examples, the processor 460 may perform the guidance process GP based on vision data VD. At this time, the vision data VD may be generated by the camera 420. In one example, the vision data VD may include at least one of an Electro-Optical (EO) image captured using a wide-angle lens or a telephoto lens and an Infrared (IR) image captured using a wide-angle lens or a telephoto lens.

For example, referring to FIGS. 1, 5, 10, and 11, in the guidance process GP, the processor 460 may perform a "detection process" to identify the target TG through a detection model (hereinafter referred to as "DM") and a "trajectory setting process" to establish a flight trajectory to approach the target TG based on the detection result. At this time, the detection model DM may be stored in the memory 430 or the control device 200.

A more detailed description of the "detection process" performed by the processor 460 is as follows. First, the processor 460 may receive the vision data VD generated by the camera 420. At this time, the vision data VD may include an EO image VD1 and an IR image VD2. The EO image VD1 may include an EO image captured using a wide-angle lens and an EO image captured using a telephoto lens. Similarly, the IR image VD2 may include an IR image captured using a wide-angle lens and an IR image captured using a telephoto lens.

Next, the processor 460 may preprocess the vision data VD to generate a preprocessed image (hereinafter referred to as "PP"). In one example, the processor 460 may preprocess the EO image VD1 to generate a preprocessed image PP. For instance, the processor 460 may perform color inversion (e.g., black-and-white inversion) on the EO image VD1 to generate the preprocessed image PP.

Next, the processor 460 may input the preprocessed image PP generated by preprocessing the EO image VD1 and/or the IR image VD2 as input data (hereinafter referred to as "IP") to the detection model (hereinafter referred to as "DM").

Then, the detection model DM may identify the target TG from the received preprocessed image PP and/or the IR image VD2, display a bounding box (hereinafter referred to as "BB") around the identified target TG, display a probability (hereinafter referred to as "PB") indicating recognition accuracy on one side of the displayed bounding box BB, and output the generated bounding box BB and probability PB as output data (hereinafter referred to as "OP"). At this time, the detection model DM may be pre-trained to recognize the target TG from the input data IP when the preprocessed image PP generated by preprocessing the EO image VD1 and/or the IR image VD2 is input as input data IP and to display a bounding box BB and probability PB indicating recognition accuracy according to the recognized target TG on the corresponding input data IP. In this case, the detection model DM according to some embodiments of the present disclosure does not use each EO image VD1 and IR image VD2 as training input data separately but instead integrates the detection process by using the preprocessed image PP generated by inverting the EO image VD1 to black and white and the IR image VD2 as training input data. That is, in some embodiments of the present disclosure, instead of using separate detection models for the EO image VD1 and the IR image VD2, a unified detection model DM is used to process different types of images (EO image VD1 and IR image VD2), thereby enriching the training data of the detection model DM.

Afterward, when the target TG is identified through the detection process described above, the processor 460 may perform a "trajectory setting process" to establish a flight trajectory for approaching the target TG based on the detection result. In one example, during the trajectory setting process, the processor 460 may establish a flight trajectory to approach the target TG based on a predefined navigation law. For instance, the processor 460 may establish a flight trajectory to approach the identified target TG using a proportional navigation guidance law.

At this time, the processor 460 may correct the position of the target TG and/or the position of the target tracking device 400 based on the sensing data SD. In other words, the processor 460 may correct at least one of the position of the target TG and the position of the target tracking device 400 based on the sensing data SD.

In one example, the processor 460 may correct the position of the target TG included in the vision data VD based on the sensing data SD. For instance, the processor 460 may perform post-processing on the vision data VD using the sensing data SD through a pre-trained position adjustment algorithm, thereby correcting the position of the identified target TG within the vision data VD.

In another example, during the trajectory setting process, the processor 460 may correct the position of the target tracking device 400 based on the sensing data SD. In other words, during the trajectory setting process, the processor 460 may perform a "position correction process" to correct the position of the target tracking device 400 based on the sensing data SD. That is, the trajectory setting process may include the position correction process for correcting the position of the target tracking device 400. At this time, the sensing data SD may be generated by the sensor 410.

For example, referring to FIGS. 1, 5, 10, and 12, the processor 460 may correct the position of the target tracking device 400 using the sensing data SD acquired by the sensor 410. In other words, to more accurately determine the relative position of the target TG based on the captured vision data VD, the processor 460 may correct the original location (hereinafter referred to as "OL") of the target tracking device 400 and generate location correction data (hereinafter referred to as "LCD"). That is, since the target tracking device 400 moves at a very high speed, by the time the vision data VD is received and processed for relative position determination, the target tracking device 400 is no longer at the position where the vision data VD was originally captured but rather at a different location. In other words, assuming that the first time point is when the vision data VD is captured and the second time point is when the vision data VD is processed by the processor 460, at the second time point, when the processor 460 processes the vision data VD, the target tracking device 400 will inevitably be in a different location than the original location OL at the first time point. Accordingly, at this time, the processor 460 may generate location correction data LCD by predicting the position of the target tracking device 400 at the second time point, which is when the captured vision data VD from the first time point is processed, based on the original location OL at the first time point and the sensing data SD. Using the generated location correction data LCD and the captured vision data VD from the first time point, the processor 460 may determine the relative position of the target TG (the position of the target TG with respect to the target tracking device 400) and set a flight trajectory to approach the target TG according to the determined relative position. At this time, the sensing data SD may be data used to determine the movement direction, speed, acceleration, and position of the target tracking device 400. In one example, the sensing data SD may include inertial measurement unit (IMU) data, Global Positioning System (GPS) data, and gyroscope data; however, embodiments of the present disclosure are not limited thereto.

Hereinafter, with reference to FIG. 13, a step-by-step explanation will be provided regarding how the processor 460 performs the guidance process GP to approach the target TG using radar data RD, vision data VD, and sensing data SD according to some embodiments of the present disclosure.

Referring to FIGS. 1, 5, and 10 through 13, each step (S100 to S300) shown in FIG. 13 may be performed by the processor 460 illustrated in FIGS. 5 and 10.

First, after the target tracking device 400 is launched from the launcher 300, the processor 460 according to some embodiments may perform the first guidance process GP1 (S100). The first guidance process GP1 may be a guidance process in which, at the first tracking time point, the target tracking device 400 tracks the target TG while maintaining a predefined separation distance. At this time, the first guidance process GP1 may be referred to as "midcourse guidance," and the first tracking time point may be chronologically prior to the second tracking time point of the second guidance process, which will be described later.

In some examples, the processor 460 may perform the first guidance process GP1 using radar data RD. For example, the processor 460 may set a flight trajectory to approach the target TG based on the position information of the target TG included in the radar data RD. In other words, the processor 460 may perform the first guidance process GP1 based on radar data RD to approach the position of the target TG included in the radar data RD.

In this first guidance process GP1, the radar data RD may include an identification ID assigned to each target TG, and the processor 460 may recognize and track the target TG by using the identification ID assigned to the target TG to be tracked.

At this time, the processor 460 may verify the identification ID of the target TG to be tracked. For example, if multiple identification IDs are assigned to the target TG to be tracked, the processor 460 may determine whether the target TG corresponding to the multiple identification IDs is the same. For instance, the processor 460 may generate target trajectory prediction data by determining the predicted trajectory of the target TG using a pre-trained trajectory prediction model, and it may verify the identification ID assigned to the target TG by comparing the target trajectory prediction data with the position information of the target TG included in the radar data RD. In other words, the processor 460 may determine whether the target TG corresponding to the multiple identification IDs is the same by comparing the target trajectory prediction data output from the trajectory prediction model with the current position information of the target TG included in the radar data RD. In one example, the processor 460 may generate target trajectory prediction data for the target TG at a second time point by inputting the flight trajectory of the target TG at a first time point into the trajectory prediction model. Then, the processor 460 may identify the target TG based on the degree of match or similarity between the target trajectory prediction data and the position of the target TG at the second time point. At this time, the trajectory prediction model may be pre-trained to output a future predicted trajectory based on an input flight trajectory of the target TG and may be stored in the memory 430 or the control device 200.

In some other examples, the processor 460 may perform the first guidance process GP1 using vision data VD. For example, the processor 460 may perform the first guidance process GP1 to approach the target TG based on the vision data VD captured by the camera 420. That is, the processor 460 may perform the first guidance process GP1 based on the vision data VD to approach the position of the target TG included in the vision data VD.

For example, the processor 460 may perform the first guidance process GP1 based on the multiple cameras included in the camera 420 (e.g., 420a, 420b in FIG. 8). At this time, as previously described, the multiple cameras may include EO cameras, IR cameras, and the like; however, embodiments of the present disclosure are not limited thereto.

For instance, the processor 460 may perform the first guidance process GP1 by selecting either a telephoto camera or a wide-angle camera based on the distance between the target tracking device 400 and the target TG.

In one example, if the distance between the target tracking device 400 and the target TG is greater than or equal to a predefined first threshold distance, the processor 460 may operate a wide-angle camera among the multiple cameras and identify the target TG based on the vision data VD captured by the wide-angle camera. More specifically, the processor 460 may identify the target TG by performing the detection process using the previously described detection model DM based on the vision data VD captured by the wide-angle camera.

On the other hand, if the distance between the target tracking device 400 and the target TG falls below the first threshold distance, the processor 460 may operate a telephoto camera among the multiple cameras and identify the target TG based on the vision data VD captured by the telephoto camera. More specifically, the processor 460 may identify the target TG by performing the detection process using the previously described detection model DM based on the vision data VD captured by the telephoto camera.

At this time, as the target tracking device 400 approaches the target TG, the processor 460 may switch the operational camera back from the telephoto camera to the wide-angle camera. For example, if the distance between the target tracking device 400 and the target TG is less than or equal to a predefined second threshold distance, or if the target TG occupies a predetermined proportion or more of the vision data VD, the processor 460 may switch the active camera from the telephoto camera back to the wide-angle camera. Then, based on the vision data VD captured by the wide-angle camera, the processor 460 may perform the detection process using the previously described detection model DM to identify the target TG. That is, when the target tracking device 400 gets too close to the target TG, the vision data VD captured by the telephoto camera may display an excessively magnified image of the target TG, which could interfere with the trajectory setting process. To resolve this, the processor 460 may switch back to the wide-angle camera to adjust the proportion of the target TG displayed in the vision data VD.

In some other examples, the processor 460 may perform the first guidance process GP1 by combining radar data RD and vision data VD. For example, the processor 460 may analyze the relationship between the position information of the target TG included in the radar data RD and the position information of the target tracking device 400 and determine a search range for identifying the target TG based on this relationship analysis. Specifically, the processor 460 may compare the target TG's position information included in the radar data RD with the target tracking device 400's position information included in the sensing data SD to determine a preliminary position of the target TG relative to the target tracking device 400. Then, the processor 460 may control the camera 420 to capture the determined preliminary position, thereby adjusting the capturing range of the vision data VD. Once the camera 420 generates the vision data VD within the controlled capturing range, the processor 460 may proceed with the previously described detection process and trajectory setting process based on the captured vision data VD.

Next, the processor 460 may determine whether it is necessary to transition from the first guidance process GP1 to the second guidance process GP2 (S200). In other words, the processor 460 may determine the guidance process transition condition (hereinafter referred to as "transition condition").

For instance, the processor 460 may determine whether to transition based on predefined criteria.

In some examples, the processor 460 may determine the transition condition based on the detection process performed by the detection model DM. For example, if the recognition accuracy probability PB output by the detection model DM is equal to or greater than a predefined threshold probability, the processor 460 may determine that it is necessary to transition from the first guidance process GP1 to the second guidance process GP2.

In another example, the processor 460 may determine the transition condition based on the distance between the target tracking device 400 and the target TG. For instance, if the distance between the target tracking device 400 and the target TG reaches a predefined threshold distance, the processor 460 may determine that it is necessary to transition from the first guidance process GP1 to the second guidance process GP2.

In yet another example, the processor 460 may determine the transition condition based on externally received control signals or manual input. For instance, if the target tracking system 1 receives a transition command from the operator via the control device 200, the processor 460 may determine that it is necessary to transition from the first guidance process GP1 to the second guidance process GP2.

Next, the processor 460 may perform the second guidance process GP2 (S300). The second guidance process GP2 may be a guidance process that includes the collision process with the target TG at the second tracking time point. At this time, the second guidance process GP2 may be referred to as "terminal guidance," and the second tracking time point may be chronologically later than the first tracking time point of the previously described first guidance process GP1.

In some examples, the processor 460 may perform the second guidance process GP2 using vision data VD. For example, the processor 460 may perform the second guidance process GP2 to approach and collide with the position of the target TG included in the vision data VD based on the vision data VD captured by the camera 420.

For example, the processor 460 may proceed with the second guidance process GP2 by performing the detection process using the previously described detection model DM and the trajectory setting process based on the vision data VD. At this time, the trajectory setting process may also include the position correction process using the previously described sensing data SD.

Additionally, as described in the first guidance process GP1, the processor 460 may select either the telephoto camera or the wide-angle camera based on the distance between the target tracking device 400 and the target TG to perform the second guidance process GP2. A detailed explanation of this process is omitted.

Meanwhile, during the trajectory setting process, the processor 460 may control the target tracking device 400 to track the target TG from below. In other words, the processor 460 may control the target tracking device 400 to perform below-target tracking during the trajectory setting process. For example, after the detection process identifies the position of the target TG, the processor 460 may control the driving device 440 (e.g., motors, propellers, etc.) to track the target TG from below the identified target TG. Through this below-target tracking process, the target tracking device 400 may perform the second guidance process GP2 for the target TG more rapidly and accurately. That is, when capturing the target TG from below, the target TG appears larger in the vision data VD, improving the recognition accuracy of the detection model DM. Additionally, when capturing from above, objects on the ground may be included in the vision data VD, increasing the possibility of noise. In contrast, when capturing from below, the sky is included in the vision data VD, reducing the possibility of noise. Furthermore, due to the inherent flight characteristics of drones, where the ascending speed is generally faster than the descending speed, below-target tracking enables the drone-type target tracking device 400 to secure sufficient instantaneous acceleration.

Figure 14:
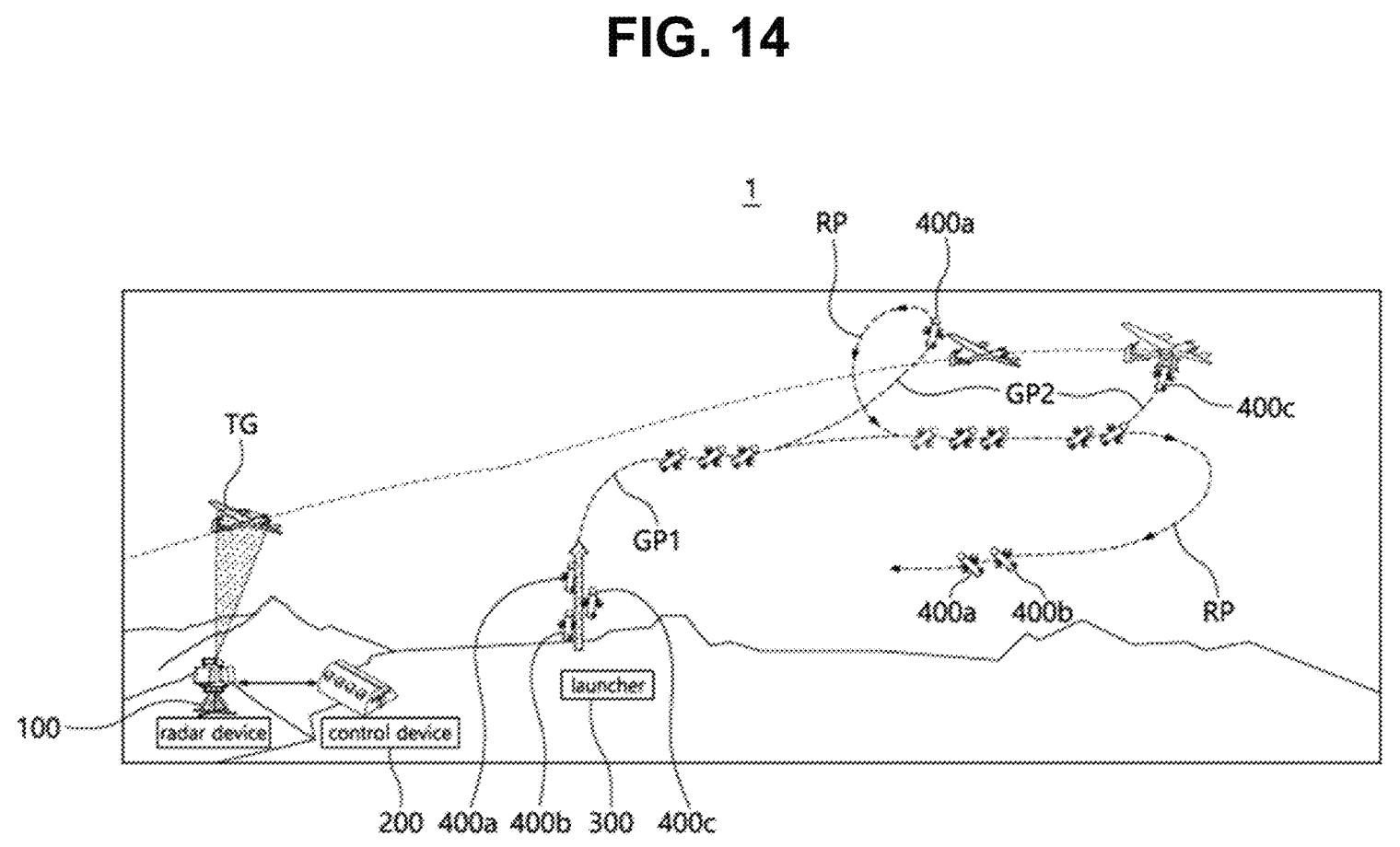

FIG. 14 is a diagram illustrating a target tracking system according to some other embodiments of the present disclosure.

Referring to FIG. 1 and FIG. 14, a target tracking system 1 according to some embodiments of the present disclosure may further include a plurality of target tracking devices 400, specifically, a first target tracking device 400a, a second target tracking device 400b, and a third target tracking device 400c. Since the radar device 100, control device 200, and launcher 300 shown in FIG. 14 have been described in detail in FIG. 1, their explanation is omitted here. Although FIG. 14 illustrates that the number of target tracking devices 400 is three, it is obvious that the embodiments of the present disclosure are not limited to this configuration.

The first target tracking device 400a, the second target tracking device 400b, and the third target tracking device 400c may perform swarm flight to track the target TG. More specifically, each of the plurality of target tracking devices 400a, 400b, and 400c may identify the target TG and perform a guidance process GP to approach the identified target TG. At this time, the guidance process GP may include the previously described first guidance process GP1 and second guidance process GP2.

The swarm flight process of the first target tracking device 400a, the second target tracking device 400b, and the third target tracking device 400c may be described step by step as follows: First, the first target tracking device 400a, the second target tracking device 400b, and the third target tracking device 400c may be launched from the launcher 300. At this time, the first target tracking device 400a, the second target tracking device 400b, and the third target tracking device 400c may be launched simultaneously from the launcher 300, or they may be launched sequentially with a time delay.

Next, the first target tracking device 400a, the second target tracking device 400b, and the third target tracking device 400c may perform the first guidance process GP1. At this time, the first target tracking device 400a, the second target tracking device 400b, and the third target tracking device 400c may fly along different flight trajectories, or they may fly side by side, as illustrated in FIG. 14.

Next, at least one of the first target tracking device 400a, the second target tracking device 400b, and the third target tracking device 400c may perform the second guidance process GP2. For ease of explanation, FIG. 14 illustrates that the first target tracking device 400a is performing the second guidance process GP2 to execute a flight toward a collision with the target TG. At this time, the amount of battery consumption of the first target tracking device 400a may be greater than that of the other target tracking devices 400b and 400c. That is, the other target tracking devices 400b and 400c, which are not performing the second guidance process GP2, may operate in a battery-saving mode during flight. For example, the target tracking devices 400b and 400c, which are flying in battery-saving mode, may track the target at a relatively lower speed or turn off some of their operational functions.

At this time, if the first target tracking device 400a successfully completes the mission of colliding with the target TG, the other target tracking devices 400b and 400c may return along a return process (hereinafter referred to as "RP"). In this case, the other target tracking devices 400b and 400c may return to the launcher 300 or to a separate station included in the target tracking system 1.

On the other hand, if the first target tracking device 400a fails to complete the mission of colliding with the target TG, at least one of the first target tracking device 400a, the second target tracking device 400b, and the third target tracking device 400c may perform the second guidance process GP2. At this time, either the first target tracking device 400a, which failed to complete the mission, may attempt the second guidance process GP2 again, or the other target tracking devices 400b and 400c, which have not yet executed the mission, may perform the second guidance process GP2. For ease of explanation, FIG. 14 illustrates that the third target tracking device 400c is executing a flight toward a collision with the target TG by performing the second guidance process GP2.

Next, if the third target tracking device 400c successfully completes the mission, the other target tracking devices 400a and 400b may return along the return trajectory RP. At this time, the other target tracking devices 400a and 400b may return to the launcher 300 or to a separate station included in the target tracking system 1.

Figure 15:
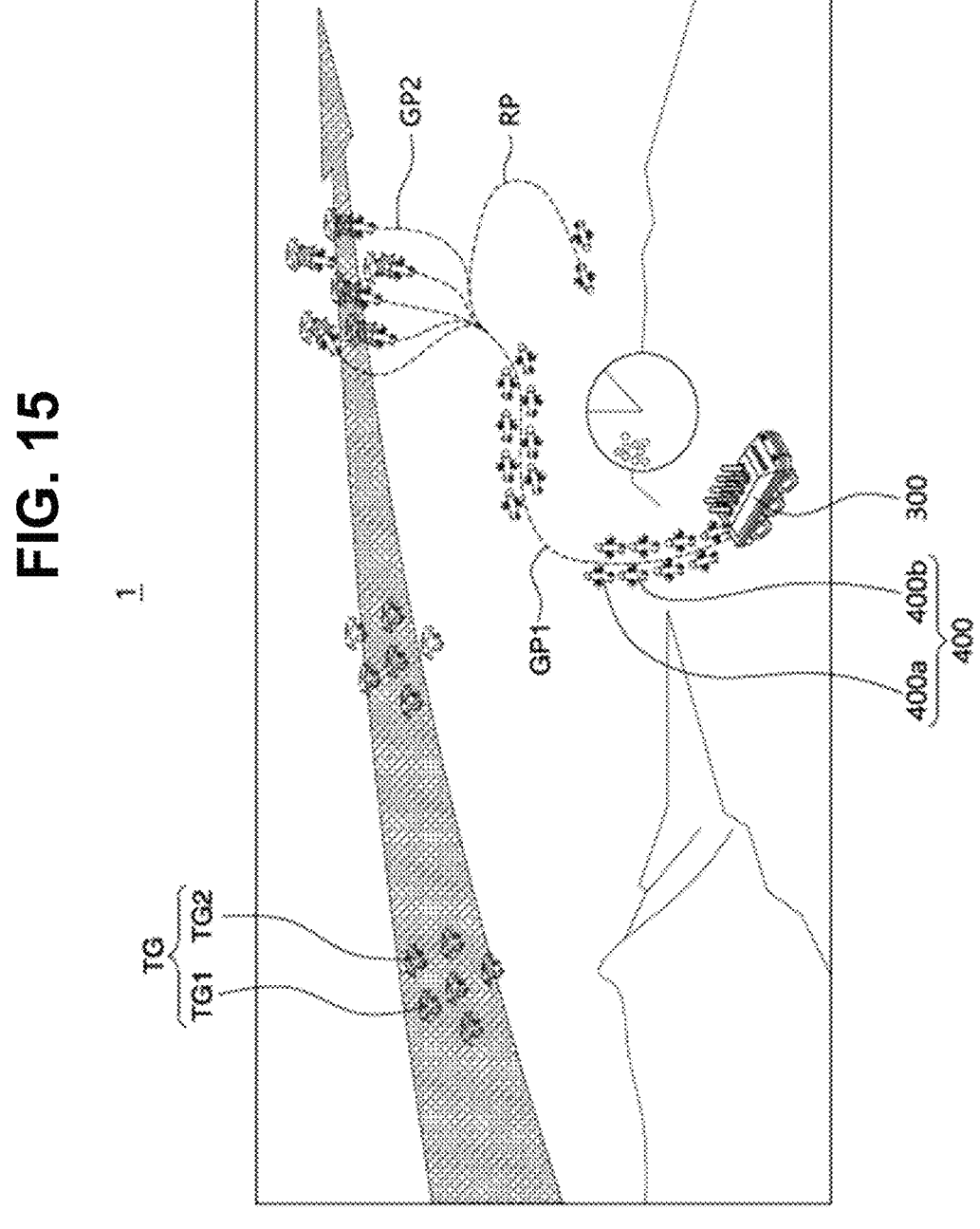
FIG. 15 is a diagram illustrating a target tracking system according to some other embodiments of the present disclosure.

FIG. 15 is a diagram illustrating a target tracking system according to some other embodiments of the present disclosure.

Referring to FIG. 1, FIG. 5, and FIG. 15, a target tracking system 1 according to some embodiments of the present disclosure may track multiple targets TG, specifically, a first target TG1 and a second target TG2, using a plurality of target tracking devices 400a, 400b, and others. Although FIG. 15 does not illustrate them, the target tracking system 1 may include the radar device 100 and the control device 200 described in FIG. 1. Since the radar device 100 and the control device 200 have been described in detail in FIG. 1, further explanation is omitted here. For ease of explanation, FIG. 15 illustrates that the number of target tracking devices 400 and targets TG are eight and six, respectively. However, it is obvious that the embodiments of the present disclosure are not limited to these numbers.

The plurality of target tracking devices 400a and 400b may perform the guidance process GP to track the plurality of targets TG1 and TG2.

At this time, the target TG for which the plurality of target tracking devices 400a and 400b will perform the guidance process GP may be individually designated among the plurality of targets TG1 and TG2. In other words, each of the target tracking devices 400a and 400b may perform the guidance process GP for different targets TG1 and TG2. For example, referring to FIG. 15, the first target tracking device 400a may perform the guidance process GP for the first target TG1, while the second target tracking device 400b may perform the guidance process GP for the second target TG2.

The step-by-step process of individually assigning each of the plurality of target tracking devices 400a and 400b to their respective targets TG1 and TG2 is as follows: First, the plurality of target tracking devices 400a and 400b may be launched from the launcher 300. At this time, the plurality of target tracking devices 400a and 400b may be simultaneously launched from the launcher 300 or may be sequentially launched with a time delay.

Next, the plurality of target tracking devices 400a and 400b may perform the first guidance process GP1. At this time, the plurality of target tracking devices 400a and 400b may fly along different flight trajectories or fly side by side, as shown in FIG. 15. During the first guidance process GP1, the plurality of target tracking devices 400a and 400b may perform the first guidance process GP1 based on the radar data RD received from the radar device 100.

Next, the plurality of target tracking devices 400a and 400b may perform the second guidance process GP2. At this time, there is a possibility that the plurality of targets TG1 and TG2, which are flying in a swarm, may be identified as a single target TG in the radar data RD. Accordingly, based on the captured vision data VD acquired by the plurality of target tracking devices 400a and 400b, each target tracking device 400a, 400b may individually designate the target TG1 or TG2 for which it will perform the second guidance process GP2.

For example, the control device 200 may receive the captured vision data VD acquired by the plurality of target tracking devices 400a and 400b and, based on the received vision data VD, may assign each target tracking device 400a and 400b to a specific target TG1 or TG2 for performing the second guidance process GP2. After assigning the targets, the control device 200 may transmit control signals to each target tracking device 400a and 400b according to the assignment results.

In another example, the plurality of target tracking devices 400a and 400b may directly or indirectly communicate with each other to determine the target TG1 or TG2 for which each target tracking device 400a, 400b will perform the second guidance process GP2.

Figure 16:
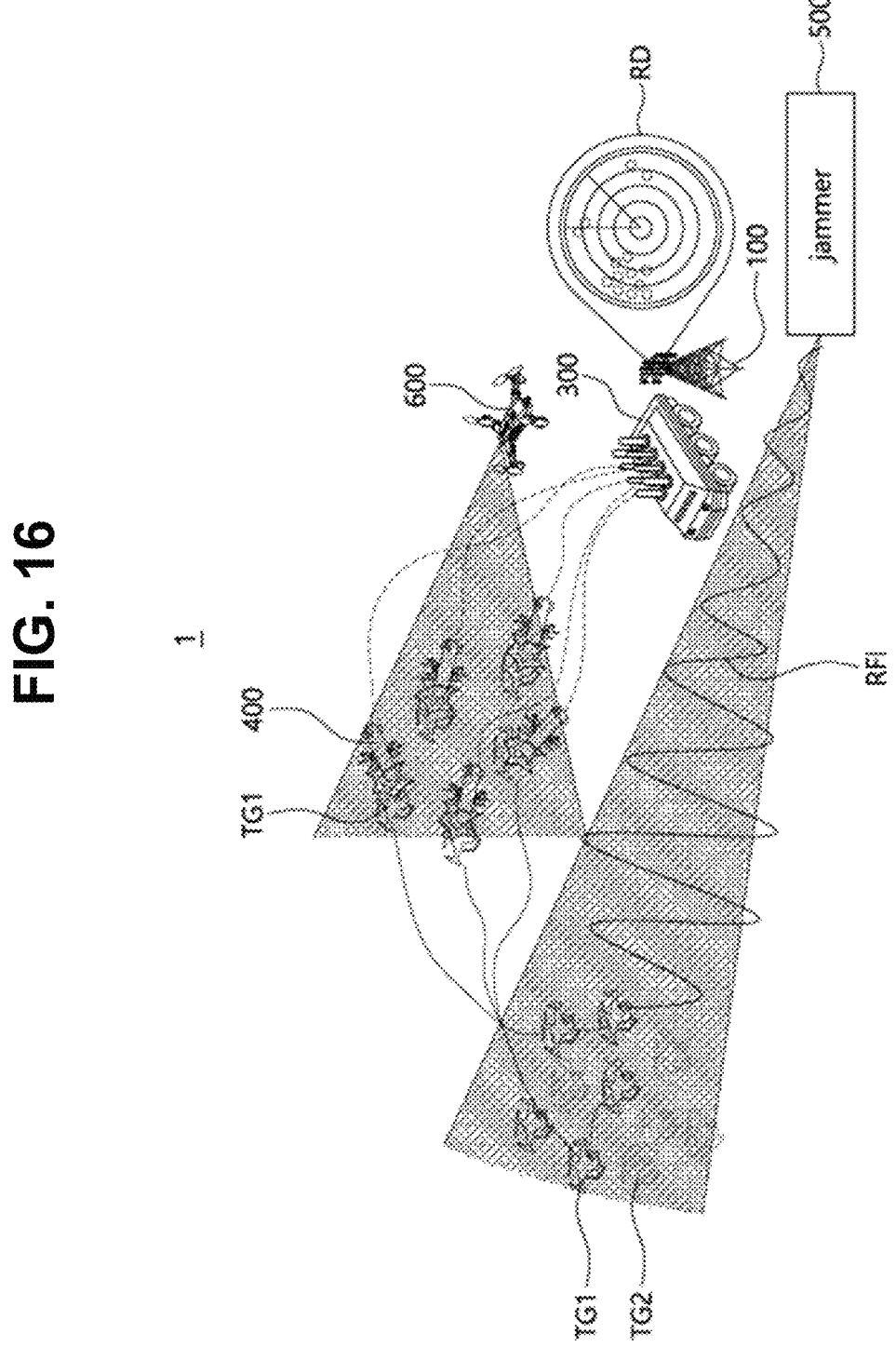
FIG. 16 is a diagram illustrating a target tracking system according to some other embodiments of the present disclosure.

FIG. 16 is a diagram illustrating a target tracking system according to some other embodiments of the present disclosure.

Referring to FIG. 1 and FIG. 16, the target tracking system 1 according to some embodiments of the present disclosure may further include a jammer 500 and a reconnaissance device 600, in addition to the radar device 100, launcher 300, and target tracking device 400 described in FIG. 1. Since the radar device 100, and launcher 300 shown in FIG. 16 have been described in detail in FIG. 1, their explanation is omitted here.

The jammer 500 may perform radio frequency interference (RFI) on multiple targets TG. For example, the jammer 500 may acquire position information of multiple targets TG based on radar data RD and, at the identified locations, may perform jamming and/or spoofing of Global Navigation Satellite System (GNSS) signals on multiple targets TG, which constitutes a soft-kill method. In this case, the jammer 500 may include known hardware and software used for soft-kill techniques, such as jammers and spoofers.

The target tracking device 400 may perform a guidance process GP for at least one target TG that remains operational despite the radio frequency interference (RFI). That is, the target tracking device 400 may approach at least one target TG that remains operational despite the radio frequency interference (RFI) and collide with the target TG. For the sake of explanation, FIG. 15 illustrates a case where the target TG that remains operational despite the radio frequency (RF) interference (RFI) is the first target TG1.

In one embodiment, the target tracking device 400 may perform the guidance process GP solely based on vision data to track the target TG. In this case, the target tracking device 400 is not affected by the jamming and spoofing of Global Navigation Satellite System (GNSS) signals, allowing it to operate alongside the jammer 500 to neutralize the target TG. Additionally, the target tracking device 400 may track the target TG even in environments where Global Navigation Satellite System (GNSS) signals are denied, such as indoors, underground, or high-density skyscraper areas.

At this time, the target tracking system 1 may identify at least one target TG that remains operational despite the radio frequency (RF) interference (RFI).

For example, the reconnaissance device 600 may identify targets TG among multiple targets TG that have not been affected by radio frequency interference (RFI). For instance, the reconnaissance device 600 may include a camera and generate vision data of targets TG that remain operational despite RFI through the camera, transmitting this data to the control device 200. The control device 200 may individually assign targets TG for which multiple target tracking devices 400 will perform the guidance process GP based on the vision data of each target TG. In this case, the reconnaissance device 600 may include a reconnaissance drone, but the embodiments of the present disclosure are not limited thereto.

However, the reconnaissance device 600 may be omitted in some embodiments of the target tracking system 1 according to the present disclosure. For example, as described above with reference to FIG. 15, if multiple target tracking devices 400 communicate directly or indirectly with each other to individually designate a target TG among those that have not been affected by radio frequency interference (RFI) for each target tracking device 400 to perform the second guidance process GP2, the reconnaissance device 600 may be omitted in the present disclosure.

Figure 17:
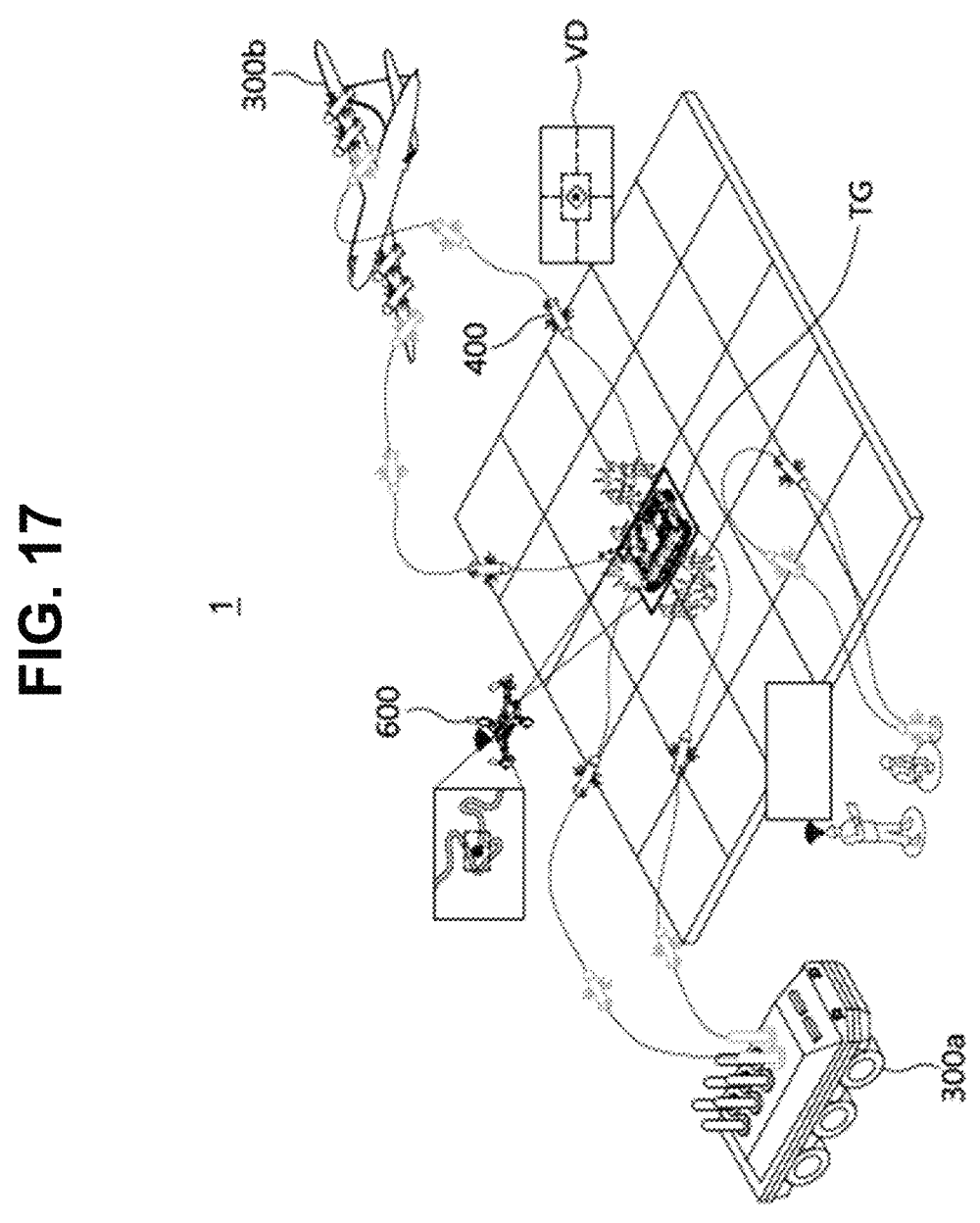

FIG. 17 is a diagram illustrating a target tracking system according to some other embodiments of the present disclosure.

Referring to FIGS. 1, 16, and 17, unlike the previous descriptions in FIGS. 1 to 16, the target tracking system 1 according to some embodiments of the present disclosure may track a target TG in the form of a stationary object. In this case, the stationary object may include ground objects such as buildings or structures; however, the embodiments of the present disclosure are not limited thereto. For convenience of explanation, FIG. 17 illustrates an example in which the target TG is a ground object. Although FIG. 17 does not illustrate them, the target tracking system 1 may include the radar device 100 and the control device 200 described in FIG. 1. Since the radar device 100 and the control device 200 have been described in detail in FIG. 1, further explanation is omitted here.

The control device 200 may recognize the position of the target TG and control at least one target tracking device 400 to be launched and collide with the target TG.

More specifically, the control device 200 may first recognize the position of the target TG. In this case, the recognized position of the target TG may be in the form of GPS data; however, the embodiments of the present disclosure are not limited thereto.

For example, the control device 200 may recognize the position of the target TG based on radar data generated by the radar device 100. For instance, if the target TG is identified in the radar data, the control device 200 may recognize the position where the target TG is located.

In another example, the control device 200 may recognize the position of the target TG through the reconnaissance device 600. For instance, the reconnaissance device 600 may capture an image of the target TG from a predefined altitude and transmit the captured vision data to the control device 200. Based on the vision data and the position data of the reconnaissance device 600, the control device 200 may recognize the position of the target TG.

In yet another example, the control device 200 may recognize the position of the target TG by utilizing Artificial Intelligence (AI). For example, the control device 200 may recognize the position of the target TG by inputting vision data or other relevant data into a pre-trained target recognition model.

Subsequently, the control device 200 may control the target tracking device 400 to be launched from at least one launcher 300 and collide with the target TG.

For example, the control device 200 may control the target tracking device 400 stored in the vehicle launcher 300a to be launched and collide with the target TG.

In another example, the control device 200 may control the target tracking device 400 stored in the aerial launcher 300b to be launched and collide with the target TG.

In yet another example, the control device 200 may control the target tracking device 400 stored in the ground launcher to be launched and collide with the target TG.

Alternatively, the target tracking device 400 may be manually launched by the operator of the target tracking system 1 to collide with the target TG.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The invention claimed is:

1. A target tracking device for tracking a target TG, comprising:
  a memory storing at least one instruction; and
  at least one processor executing the at least one instruction,
  wherein the at least one processor:
  identifies the target based on at least one of radar data acquired through a radar and vision data acquired through a camera, and performs a guidance process to approach the identified target,
  performs a first guidance process at a first tracking time point to track the target in a certain manner, and
  performs a second guidance process at a second tracking time point, which is chronologically subsequent to the first tracking time point, to track the target in a manner different from the certain manner.

2. The target tracking device according to claim 1, wherein the first guidance process and the second guidance process:

differ in at least one of a separation distance between the target tracking device and the target, a tracking direction of the target tracking device, and data used to identify the target in each of the first guidance process and the second guidance process.

3. The target tracking device according to claim 2, wherein the processor:
  controls the target tracking device to track the target at a predetermined separation distance in the first guidance process, and
  controls the target tracking device to approach the identified target and collide with the target in the second guidance process.

4. The target tracking device according to claim 2, wherein the processor:
  controls the target tracking device to track and approach the identified target from below in the second guidance process.

5. The target tracking device according to claim 2, wherein the processor:
  performs the first guidance process based on at least one of the radar data and the vision data at the first tracking time in the first guidance process, and
  performs the second guidance process based on the vision data at the second tracking time in the second guidance process.

6. The target tracking device according to claim 5, wherein the processor:
  performs the first guidance process by setting a flight trajectory to approach the target based on the position information of the target included in the radar data in the first guidance process.

7. The target tracking device according to claim 5, wherein the processor:
  performs the first guidance process by combining the radar data and the vision data in the first guidance process.

8. The target tracking device according to claim 7, wherein the processor:
  in the first guidance process,
  determines the relationship between the position information of the target included in the radar data and the position information of the target tracking device,
  determines a search range for identifying the target based on the determined relationship, and
  performs the first guidance process by identifying the target based on the vision data within the determined search range and setting a flight trajectory to approach the target.

9. The target tracking device according to claim 1, wherein the processor:
  identifies the target from the vision data by inputting the vision data into a pre-trained detection model, and
  transitions from the first guidance process to the second guidance process based on at least one of the recognition accuracy probability output by the detection model, the distance between the target tracking device and the target, and a control command received from a control device linked to the target tracking device.

10. A target tracking device for tracking a target, comprising:
  a memory storing at least one instruction; and
  at least one processor executing the at least one instruction,
  wherein the processor:
  identifies the target based on at least one of communication with a reconnaissance device linked to the target tracking device and vision data acquired through a camera included in the target tracking device, and performs a guidance process to approach the identified target, wherein, at a first tracking time point, the processor performs a first guidance process to track the target in a certain manner, and at a second tracking time point, which is chronologically subsequent to the first tracking time point, the processor performs a second guidance process to track the target in a manner different from the certain manner.

* * * * *